US008690674B2

(12) United States Patent
Kando et al.

(10) Patent No.: US 8,690,674 B2
(45) Date of Patent: Apr. 8, 2014

(54) STORAGE MEDIUM HAVING GAME PROGRAM STORED THEREON AND GAME APPARATUS

(75) Inventors: Yuuji Kando, Kyoto (JP); Yutaka Hiramuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 615 days.

(21) Appl. No.: 12/941,481

(22) Filed: Nov. 8, 2010

(65) Prior Publication Data
US 2011/0053687 A1 Mar. 3, 2011

Related U.S. Application Data

(62) Division of application No. 11/349,251, filed on Feb. 8, 2006, now Pat. No. 7,828,660.

(30) Foreign Application Priority Data

May 9, 2005 (JP) ................................. 2005-136542

(51) Int. Cl.
*G07F 17/32* (2006.01)

(52) U.S. Cl.
USPC ...................... 463/37; 463/8; 463/42; 463/43

(58) Field of Classification Search
USPC .......................................... 463/42, 8, 37, 43
See application file for complete search history.

(56) References Cited

U.S. PATENT DOCUMENTS

| 4,353,552 A | 10/1982 | Pepper, Jr. |
| 5,601,487 A | 2/1997 | Oshima et al. |
| 5,769,713 A | 6/1998 | Katayama |
| 5,841,440 A | 11/1998 | Guha |
| 5,863,248 A | 1/1999 | Mine et al. |
| 6,120,374 A | 9/2000 | Akada et al. |
| 6,154,197 A | 11/2000 | Watari et al. |
| 6,165,073 A | 12/2000 | Miyamoto et al. |
| 6,191,777 B1 | 2/2001 | Yasuhara et al. |
| 6,196,917 B1 | 3/2001 | Mathias et al. |

(Continued)

FOREIGN PATENT DOCUMENTS

| JP | 63-40967 | 2/1988 |
| JP | 63-280325 | 11/1988 |

(Continued)

OTHER PUBLICATIONS

JPO, "Notice of Reasons for Rejection," Japanese Patent Application No. 2004-304961, dated Dec. 5, 2008.

(Continued)

*Primary Examiner* — Omkar Deodhar
(74) *Attorney, Agent, or Firm* — Nixon & Vanderhye P.C.

(57) ABSTRACT

In a coordinate detection step, a series of coordinate values each of which indicates a position which is on a display screen and is inputted through a pointing device, are detected at intervals of a unit time. Further, an operation state determination step determines whether or not a player is controlling a first object with the pointing device. When the operation state determination step determines that the player is controlling the first object, the selection determination step determines whether or not an input track of the pointing device forms an enclosed area for enclosing a second object based on the series of coordinate values. When the enclosed area has been formed, the first object and the second object are caused to perform predetermined actions.

16 Claims, 27 Drawing Sheets

(56) References Cited

U.S. PATENT DOCUMENTS

| | | |
|---|---|---|
| 6,217,446 B1 | 4/2001 | Sanbongi et al. |
| 6,225,978 B1 | 5/2001 | McNeil |
| 6,270,413 B1 | 8/2001 | Aikawa et al. |
| 6,271,854 B1 | 8/2001 | Light |
| 6,354,940 B1 | 3/2002 | Itou et al. |
| 6,371,849 B1 | 4/2002 | Togami |
| 6,494,783 B2 | 12/2002 | Namba et al. |
| 6,524,186 B2 | 2/2003 | Takatsuka et al. |
| 6,542,155 B1 | 4/2003 | Mifune et al. |
| 6,602,139 B2 | 8/2003 | Yamaguchi |
| 6,654,496 B1 | 11/2003 | Goldberg |
| 6,676,518 B1 | 1/2004 | Sawa et al. |
| 6,762,746 B2 | 7/2004 | Fukuda |
| 6,821,206 B1 | 11/2004 | Ishida et al. |
| 6,842,175 B1 | 1/2005 | Schmalstieg et al. |
| 7,299,424 B2 | 11/2007 | Jarrett et al. |
| 7,366,995 B2 | 4/2008 | Montague |
| 7,371,163 B1 | 5/2008 | Best |
| 7,828,660 B2 * | 11/2010 | Kando et al. .............. 463/37 |
| 2001/0008846 A1 | 7/2001 | Yamauchi et al. |
| 2002/0023265 A1 | 2/2002 | Metcalf |
| 2002/0103031 A1 | 8/2002 | Neveu et al. |
| 2003/0003978 A1 | 1/2003 | Tsuchida |
| 2003/0017863 A1 | 1/2003 | Takahashi et al. |
| 2003/0216177 A1 | 11/2003 | Aonuma et al. |
| 2004/0100479 A1 | 5/2004 | Nakano et al. |
| 2004/0207602 A1 | 10/2004 | Okamura |
| 2008/0170752 A1 * | 7/2008 | Murayama .............. 382/103 |

FOREIGN PATENT DOCUMENTS

| | | |
|---|---|---|
| JP | 5-165565 | 7/1993 |
| JP | 9-245199 | 9/1997 |
| JP | 10-290886 | 11/1998 |
| JP | 10-333834 | 12/1998 |
| JP | 10-340157 | 12/1998 |
| JP | 11-7372 | 1/1999 |
| JP | 11-095650 | 4/1999 |
| JP | 11-353080 | 12/1999 |
| JP | 2000-61142 | 2/2000 |
| JP | 2002-163103 | 6/2002 |
| JP | 2003-024639 | 1/2003 |
| JP | 2003-330586 | 11/2003 |
| JP | 2004-70920 | 3/2004 |
| JP | 2004-341924 | 12/2004 |
| JP | 2005-332231 | 12/2005 |
| JP | 2006-122407 | 5/2006 |
| JP | 2006244353 | 9/2006 |

OTHER PUBLICATIONS

Explanation of Circumstances Concerning Accelerated Examination, Japanese Patent Application No. 2008-167401, Submitted Jul. 1, 2008.

Explanation of Circumstances Concerning Accelerated Examination, Japanese Patent Application No. 2005-128133, Submitted Aug. 8, 2008.

Explanation of Circumstances Concerning Accelerated Examination. Application No. JP 2008-290212.

"PikMin Book," the extra number of Famitsu, ENTERBRAIN, Inc., pp. 36-37, Nov. 2001.

StarCraft User Manual, Blizzard Entertainment, 1998, All.

* cited by examiner

FIG. 16

| INPUT ORDER | COORDINATE DATA |
|---|---|
| 1 | (80,40) |
| 2 | (77,42) |
| 3 | (75,45) |
| ... | ... |
| n-1 | (84,44) |
| n | (81,39) |

| OBJECT TYPE | TASK PROCESS | PRIORITY |
|---|---|---|
| PLAYER CHARACTER | ADD PLAYER CHARACTER TO ARRAY | 2 |
| OPPONENT | HIT OPPONENT | 1 |
| FLOWER | PICK FLOWERS AND TAKE THE SAME TO BASE | 5 |
| FOOD | PICK UP FOOD AND CARRY THE SAME TO BASE | 3 |
| DEAD BODY OF OPPONENT | PICK UP DEAD BODY AND CARRY THE SAME TO BASE | 4 |

| | FLAG NAME | ON | OFF | NUMBER |
|---|---|---|---|---|
| 254 | INTERSECTION FLAG | INPUT TRACK FORMS ENCLOSED AREA | INPUT TRACK DOES NOT FORM ENCLOSED AREA | ONE |
| 255 | TOUCH INPUT FLAG | TOUCH PANEL IS BEING KEPT TOUCHED | NEW INPUT | ONE |
| 256 | FOCUS FLAG | THE PLAYER CHARACTER IS DESIGNATED (=ENCLOSED BY RED CIRCLE (INSTRUCTION WAITING CIRCLE)) | THE PLAYER CHARACTER IS NOT DESIGNATED | EACH PLAYER CHARACTER HAS ITS FOCUS FLAG SET AS "ON" OR "OFF" |
| 257 | IN-OPERATION FLAG | PLAYER IS CONTROLLING FOCUS CHARACTER (YELLOW CIRCLE (OPERATION CIRCLE) IS INDICATED) | PLAYER IS NOT CONTROLLING FOCUS CHARACTER (=PLAYER IS NOT TOUCHING TOUCH PANEL) | ONE |

COMPENSATING LINE SEGMENT K

US 8,690,674 B2

STORAGE MEDIUM HAVING GAME PROGRAM STORED THEREON AND GAME APPARATUS

CROSS REFERENCE OF RELATED APPLICATION

This application is a divisional of application Ser. No. 11/349,251 filed Feb. 8, 2006, which claims priority to Japanese Patent Application No. 2005-136542, both of which are incorporated herein by reference.

BACKGROUND OF THE INVENTION

1. Field of the Invention

The present invention relates to a storage medium having a game program stored thereon and a game apparatus, and more particularly to a storage medium having stored thereon a game program and a game apparatus for which a pointing device is used as an input device.

2. Description of the Background Art

Conventionally, there is a game in which a player causes an object to perform a predetermined action such as attacking another object. The object is caused to perform the predetermined action in the following methods.

For example, in a game such as an ARPG (action roll playing game), when a player object is moved so as to be very close to an opponent object, a player presses an attack button, whereby, for example, a player character attacks the opponent character with a sword.

Further, in a game introduced in "Famitsu, the extra number, Pikmin Book" (ENTERBRAIN, INC. pages 36 to 37, November, 2001), a player can move a player object having a plurality of first objects and further the player can control a controller stick so as to aim a cursor at a target. While aiming the cursor at the target, the player presses a button, whereby the player object throws one of the plurality of first objects at the target. The remaining first objects automatically start to perform a predetermined action, such as attacking the target, according to what the target is.

However, the conventional method as described above have the following problems.

Firstly, when a player desires to cause a player object to attack an opponent object, the player moves the player object so as to approach the opponent object and presses an attack button. This series of operations may not be necessarily appropriate depending on a game content.

Further, when a method is used in which a player character throws objects held by the player character so as to automatically start a predetermined action, an operation for turning a cursor to a target is required before the predetermined action is automatically started. Therefore, depending on a game content, the player will be bothered with the operation for turning the cursor to the target, thereby deteriorating controllability for the player.

SUMMARY OF THE INVENTION

Therefore, a storage medium has been invented having stored thereon a game program and a game apparatus which can enhance controllability by allowing a player to intuitively perform selection operation.

A first aspect of the disclosure herein is directed to a storage medium having stored thereon a game program which causes a computer, in a game apparatus comprising a display screen (12) for displaying a game image and a pointing device (15) associated with the display screen, to execute: a coordinate detection step (S2); an operation state determination step (S9); a selection determination step (S51); and an effect action process step (S53 and S54). The coordinate detection step detects, at intervals of a unit time, a series of coordinate values each of which is inputted through the pointing device and indicates a position on the display screen, based on an output signal from the pointing device. The operation state determination step determines whether or not a player is controlling a first object with the pointing device, based on the output signal from the pointing device. The selection determination step determines, when the operation state determination step determines that the player is controlling the first object, whether or not a second object is selected based on the series of coordinate values detected in the coordinate detection step. The effect action process step causes either one of the first object and the second object to perform an action for exerting an effect on the other when the selection determination step determines that the second object is selected.

In a second aspect based on the first aspect, the selection determination step determines whether or not an input track made by the player forms a track for enclosing the second object based on the series of coordinate values detected in the coordinate detection step, and determines that the second object is selected when the track for enclosing the second object is determined to have been formed.

In a third aspect based on the first aspect, the game program causes the computer to further execute: a line segment calculation step (S43); an intersection determination step (S46); and a presence determination step (S51). The line segment calculation step calculates, based on the series of coordinate values detected in the coordinate detection step, a plurality of line segments each of which connects two consecutive coordinate points. The intersection determination step determines whether or not an input track formed of the plurality of line segments intersects a final line segment among the plurality of line segments. The presence determination step determines, when the intersection determination step determines that the input track intersects the final line segment, whether or not the second object is present in an area which is on the display screen and is enclosed by the input track. Further, the selection determination step determines that the second object is selected when the presence determination step determines that the second object is present in the area which is on the display screen and is enclosed by the input track.

In a fourth aspect based on the first aspect, the selection determination step determines whether or not an input track made by the player passes through the second object based on the series of coordinate values detected in the coordinate detection step, and determines that the second object is selected when the input track made by the player is determined to have passed through the second object.

A fifth aspect of the disclosure herein is directed to a storage medium having stored thereon a game program which causes a computer, in a game apparatus comprising a display screen (12) for displaying a game image and a pointing device (15) associated with the display screen, to execute: a coordinate detection step (S2); a line segment calculation step (S43); an enclosure determination step (S47); a selection step (S81); and an action process step (S83 and S84). The coordinate detection step detects, at intervals of a unit time, a series of coordinate values each of which is inputted through the pointing device and indicates a position on the display screen, based on an output signal from the pointing device. The line segment calculation step calculates, based on the series of coordinate values detected in the coordinate detection step, a plurality of line segments each of which connects two consecutive coordinate points. The enclosure determination step determines whether or not the input track formed of the plurality of line segments encloses at least one object on the display screen. The selection step selects, when the enclosure determination step determines that the at least one object is enclosed, the at least one object. The action process step causes, when the selection step selects the at least one object, the selected object to perform a predetermined action.

In a sixth aspect based on the fifth aspect, the game program causes the computer to further execute an intersection determination step and a presence determination step. The intersection determination step determines whether or not the input track formed of the plurality of line segments intersects a final line segment among the plurality of line segments. The presence determination step determines, when the intersection determination step determines that the input track intersects the final line segment, whether or not the at least one object is present in an area which is on the display screen and is enclosed by the input track. Further, the selection step selects the at least one object which is determined, in the presence determination step, to be present in the area which is on the display screen and is enclosed by the input track.

A seventh aspect of the disclosure herein is directed to a storage medium having stored thereon a game program which causes a computer, in a game apparatus comprising a display screen (12) for displaying a game image and a pointing device (15) associated with the display screen, to execute: a coordinate detection step (S2); a line segment calculation step (S43); a compensated track calculation step (S44); a compensated track storage step (S44); and a game process step. The coordinate detection step detects, at intervals of a unit time, a series of coordinate values each of which is inputted through the pointing device and indicates a position on the display screen, based on an output signal from the pointing device. The line segment calculation step calculates, based on the series of coordinate values detected in the coordinate detection step, a plurality of line segments each of which indicates a distance and a direction between two consecutive coordinate points. The compensated track calculation step calculates a compensated input track by subjecting, to a predetermined calculation, the plurality of line segments having been calculated. The compensated track storage step stores, in a memory, the compensated input track having been calculated. The game process step performs a predetermined game process based on the stored compensated input track.

In an eighth aspect based on the seventh aspect, the game program causes the computer to further execute a compensating line segment generation step (S44) of storing, in the memory, a line segment obtained by subjecting a final line segment among the plurality of line segments to a predetermined calculation as a compensating line segment. Further, the compensated track calculation step calculates the compensated input track by adding the compensating line segment to the plurality of line segments.

In a ninth aspect based on the seventh aspect, the game program causes the computer to further execute: an operation state determination step (S9); a presence determination step (S51); and an effect action process step (S53 and S54). The operation state determination step determines whether or not a player is controlling a first object with the pointing device, based on the output signal from the pointing device. The presence determination step determines, when the operation state determination step determines that the player is controlling the first object, whether or not a second object is present in an area which is on the display screen and is enclosed by the compensated input track. The effect action process step causes either one of the first object and the second object to perform an action for exerting an effect on the other when the presence determination step determines that the second object is present in the area which is on the display screen and is enclosed by the compensated input track.

In a tenth aspect based on the seventh aspect, the game program causes the computer to further execute a presence determination step and a selection step. The presence determination step determines whether or not an object is present in an area which is on the display screen and is enclosed by the compensated input track. The selection step selects the object which is determined, in the presence determination step, to be present in the area which is on the display screen and is enclosed by the compensated input track.

A game apparatus is disclosed herein comprising a computer having the game program executed. For example, the game apparatus may comprise a display screen for displaying a game image and a pointing device associated with the display screen. The game apparatus comprises: a coordinate detection section for detecting, at regular time intervals, a series of coordinate values each of which is inputted through the pointing device and indicates a position on the display screen, based on an output signal from the pointing device; an operation state determination section for determining whether or not a player is controlling a first object with the pointing device, based on the output signal from the pointing device; a selection determination section for determining, when the operation state determination section determines that the player is controlling the first object, whether or not a second object is selected based on the series of coordinate values detected in the coordinate detection step; and an effect action process section for causing either one of the first object and the second object to perform an action for exerting an effect on the other when the selection determination step determines that the second object is selected.

According to the first aspect, when a character is being controlled using the pointing device, selection operation can be included in the process for controlling the character using the pointing device. As a result, an additional operation such as pressing a button for selection can be eliminated, thereby providing a player with a game having improved controllability.

According to the second aspect, selection is possible by performing an operation of "enclosing". Therefore, the player can more intuitively and easily perform an operation with improved controllability. Further, the "enclosing" operation can be performed according to the player's intention, whereby the selection will not be performed against the player's intention due to an erroneous operation and the like. Thereby, the player can be provided with a game having improved controllability.

According to the third aspect, when an input track obtained by one stroke input from the player intersects itself and an object is present in an area which is on a screen and is enclosed by the input track, the object is selected. Therefore, as in the second aspect, the player can intuitively select an object according to the player's intention.

According to the fourth aspect, when the input track obtained by the one stroke input from the player passes through an object, the object is selected. Thereby, the player can intuitively select an object according to the player's intention.

According to the fifth aspect, when it is determined that a predetermined object on a screen is enclosed by an input track obtained by one stroke input from the player using the pointing device, the object is selected, and the enclosed object can be caused to perform a predetermined action. Accordingly, the player can be provided with a game which can be more intuitively controlled as compared to a conventional game requiring an additional operation such as pressing a button for selection.

According to the sixth aspect, when an input track obtained by one stroke input from the player intersects itself and an object is present in an area which is on a screen and is enclosed by the input track, the object is selected. Accordingly, as in the third aspect, the player can intuitively select an object according to the player's intention.

According to the seventh aspect, an input operation performed by a player using the pointing device can be compensated. Therefore, in a case where, although the player thinks that the player has completed the operation according to the player's intention, the operation may have not been actually completed, the operation can be compensated so as to realize an operation as intended by the player. Accordingly, the player can be provided with a game having improved controllability.

According to the eighth aspect, a final portion of the input track obtained by one stroke input from the player is compensated. Therefore, the player's intention can be further reflected in the compensating operation.

According to the ninth aspect, an operation of causing a predetermined object to perform a predetermined action can be included in the process for controlling a character with the pointing device. Therefore, an additional operation such as pressing a button for selection or for determining an action can be eliminated, thereby providing the player with a game having improved controllability.

According to the tenth aspect, an operation performed by a player using the pointing device can be compensated so as to select a predetermined object. Therefore, a situation can be avoided in which, although the player thinks that an operation for selecting an object has been performed, the selection has not been performed according to the player's intention. Thereby, the player can be provided with a game having improved controllability.

These and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a diagram illustrating an example of an input coordinate list 252;

FIG. 17 is a diagram illustrating an example of a task content determination table 253;

FIG. 18 is a table providing a listing of respective flags used for the embodiment;

DESCRIPTION OF THE PREFERRED EMBODIMENTS

Hereinafter, a configuration and an operation of a game apparatus according to an embodiment of the present invention will be described.

Figure 1:
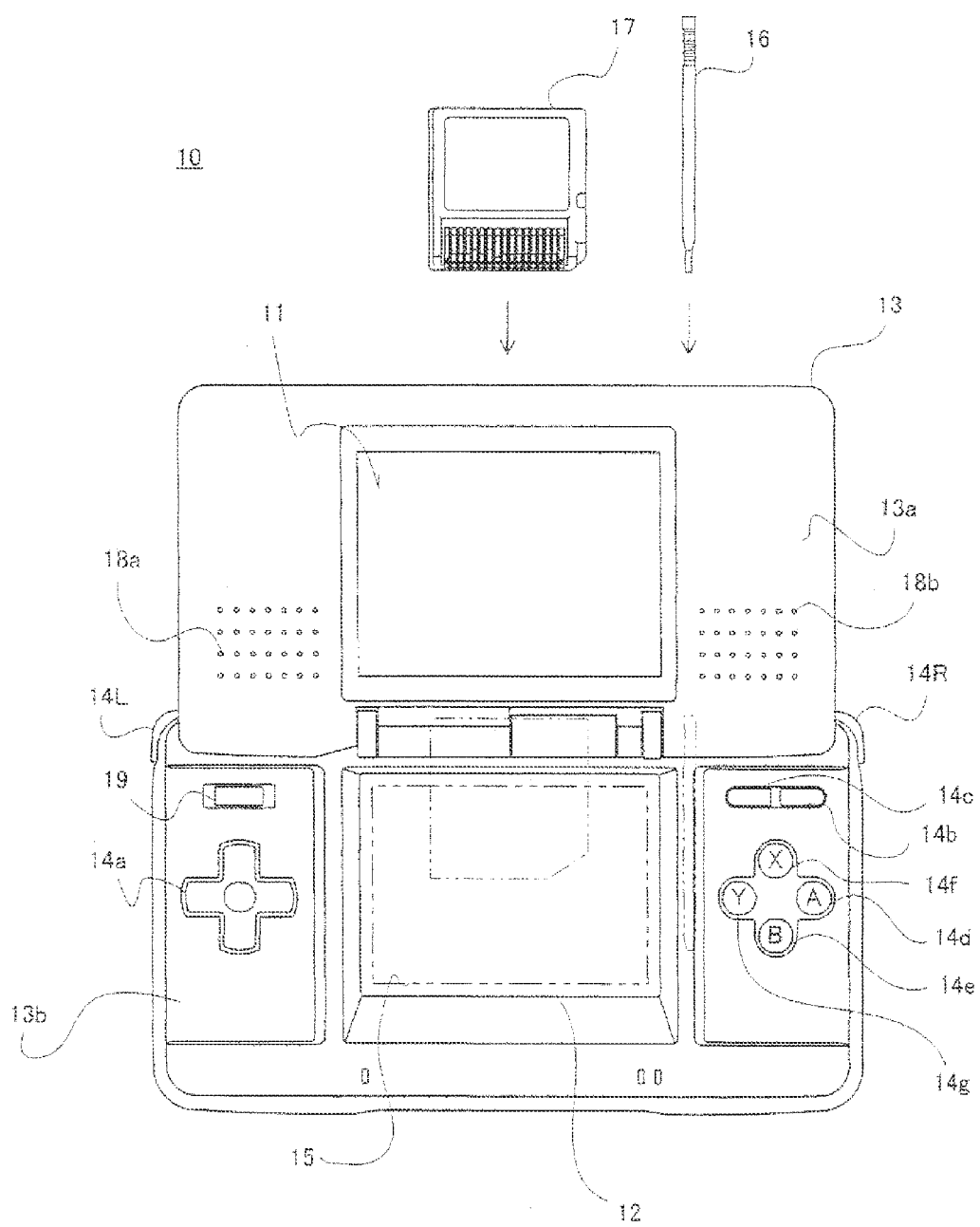
FIG. 1 is a view illustrating an outer appearance of a game apparatus according to an embodiment of the present invention.

FIG. 1 is a view illustrating an outer appearance of a game apparatus according to an embodiment of the present invention. In FIG. 1, a game apparatus 10 includes a first liquid crystal display (hereinafter, referred to as "an LCD") 11 and a second LCD 12. A housing 13 is composed of an upper housing 13a and a lower housing 13b. The first LCD 11 is accommodated in the upper housing 13a and the second LCD 12 is accommodated in the lower housing 13b. Each of the first LCD 11 and the second LCD 12 has a resolution of 256 dots×192 dots. Although in the present embodiment, an LCD is used as a display device, any other display device, for example, a display device using an EL (electro luminescence), can be used. The resolution of display may be arbitrarily chosen.

On the upper housing 13a, provided are sound holes 18a and 18b for outputting a sound from a pair of loudspeakers 30a and 30b shown in FIG. 2 described below.

On the lower housing 13b, provided as input devices are a cross switch 14a, a start switch 14b, a select switch 14c, an A button 14d, a B button 14e, an X button 14f, a Y button 14g, an L button 14L and an R button 14R. Further, the second LCD 12 has a touch panel 15 mounted on the screen thereof as another input device. Moreover, the lower housing 13b is provided with a power supply switch 19, and respective receptacles into which a memory card 17 and a stick 16 are inserted.

The touch panel 15 may be of any type such as a resistive film type, an optical type (infrared type), or a capacitive coupling type. The touch panel 15 has a function of outputting, when the touch panel 15 has its surface touched by the stick 16, coordinate data corresponding to the touched position. Although in the present embodiment a player controls the touch panel 15 with the stick 16, the player can control the touch panel 15 with a pen (stylus pen) or a finger instead of the stick 16. In the present embodiment, the touch panel 15 has a resolution (detection accuracy) of 256 dots×192 dots, similar to the resolution of the second LCD 12. However, the touch panel 15 need not necessarily have the same resolution as the second LCD 12.

The memory card 17 is a storage medium having a game program stored thereon, and is detachably inserted into a receptacle provided in the lower housing 13b.

Next, referring to FIG. 2, the internal structure of the game apparatus 10 will be described.

Figure 2:
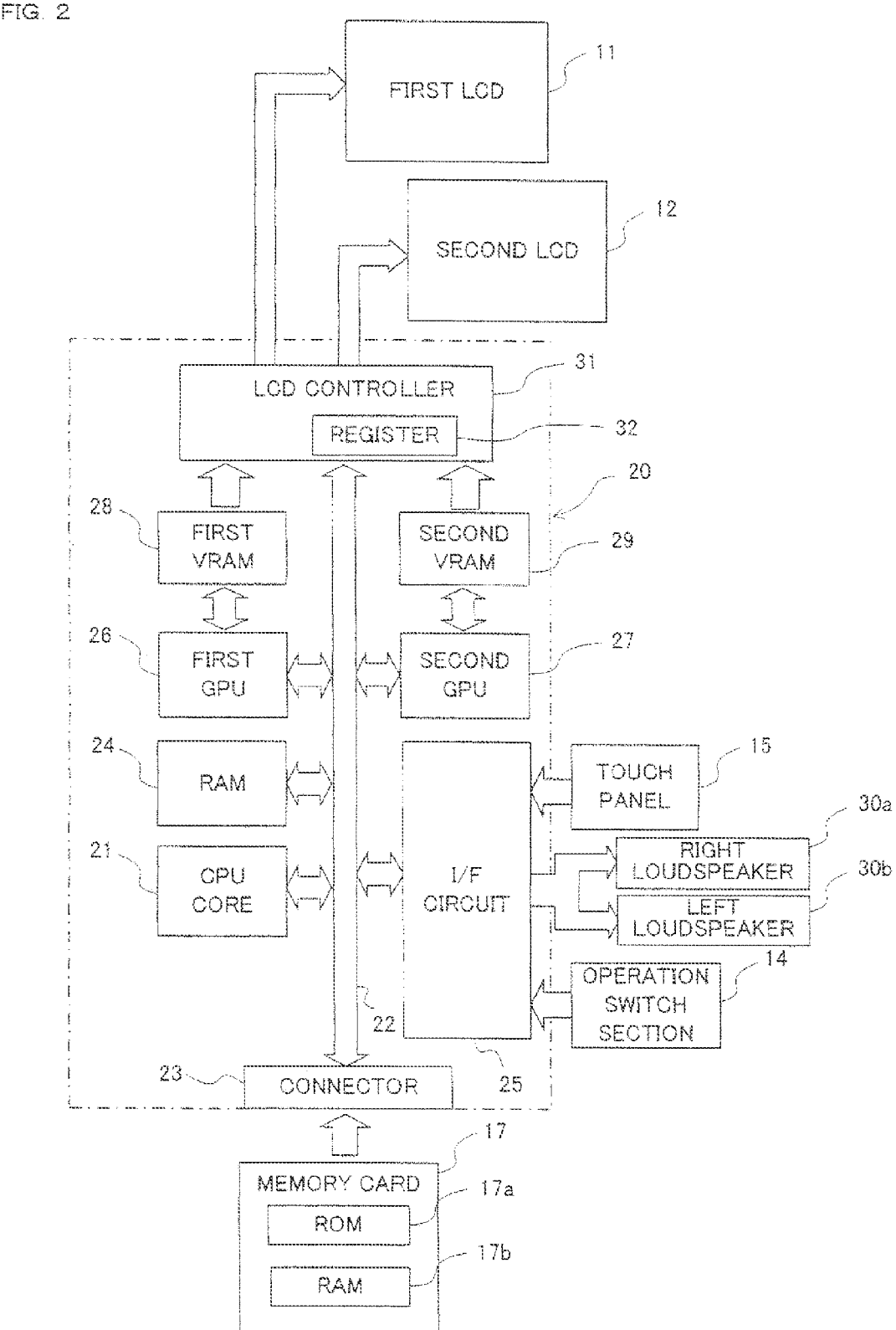
FIG. 2 is a diagram illustrating an internal structure of the game apparatus shown in FIG. 1.

In FIG. 2, a CPU core 21 is mounted on the electronic circuit board 20 accommodated in the housing 13. Via a bus 22, the CPU core 21 is connected to a connector 23, an input/output interface circuit (denoted as an I/F circuit in FIG. 2) 25, a first graphics processing unit (hereinafter, referred to as "GPU") 26, a second GPU 27, a RAM 24, an LCD controller 31, and a wireless communication section 33. The memory card 17 is detachably connected to the connector 23. The memory card 17 includes a ROM 17a for storing a game program and a RAM 17b for storing backup data in a rewritable manner. A game program stored in the ROM 17a of the memory card 17 is loaded to the RAM 24, and the game program having been loaded to the RAM 24 is executed by the CPU core 21. Temporary data obtained by the CPU core 21 executing the game program and data from which to generate game images are stored in the RAM 24 in addition to the game program. The touch panel 15, the right loudspeaker 30a, the left loudspeaker 30b and an operation switch section 14 including the cross switch 14a, the A button 14d and the like as shown in FIG. 1 are connected to the I/F circuit 25. The right loudspeaker 30a and the left loudspeaker 30b are placed inside the sound holes 18a and 18b, respectively.

The first GPU 26 is connected to a first video-RAM (hereinafter "VRAM") 28. The second GPU 27 is connected to a second VRAM 29. In accordance with an instruction from the CPU core 21, the first GPU 26 generates a first game image using the data stored in the RAM 24 for generating a game image, and writes image data into the first VRAM 28. Similarly, in accordance with an instruction from the CPU core 21, the second GPU 27 generates a second game image, and writes image data into the second VRAM 29. The first VRAM 28 and the second VRAM 29 are connected to the LCD controller 31.

The LCD controller 31 include a register 32. The register 32 stores a value "0" or "1" in accordance with an instruction from the CPU core 21. When the register 32 stores a value "0", the LCD controller 31 outputs to the first LCD 11 the first game image which has been written into the first VRAM 28, and outputs to the second LCD 12 the second game image which has been written into the second VRAM 29. On the other hand, when the register 32 stores a value "1", the LCD controller 31 outputs to the second LCD 12 the first game image which has been written into the first VRAM 28, and outputs to the first LCD 11 the second game image which has been written into the second VRAM 29.

The aforementioned configuration of the game apparatus 10 is an example. Computer systems having a pointing device such as a touch panel, a mouse or a touch pad and at least one display device are suitable for the game apparatus disclosed herein. Further, the game program may be supplied to the computer system not only through an external storage medium such as the memory card 17 but also through a wired or a wireless communication line. Moreover, the game program may be previously stored in a non-volatile storage device in the computer system.

Figure 3:
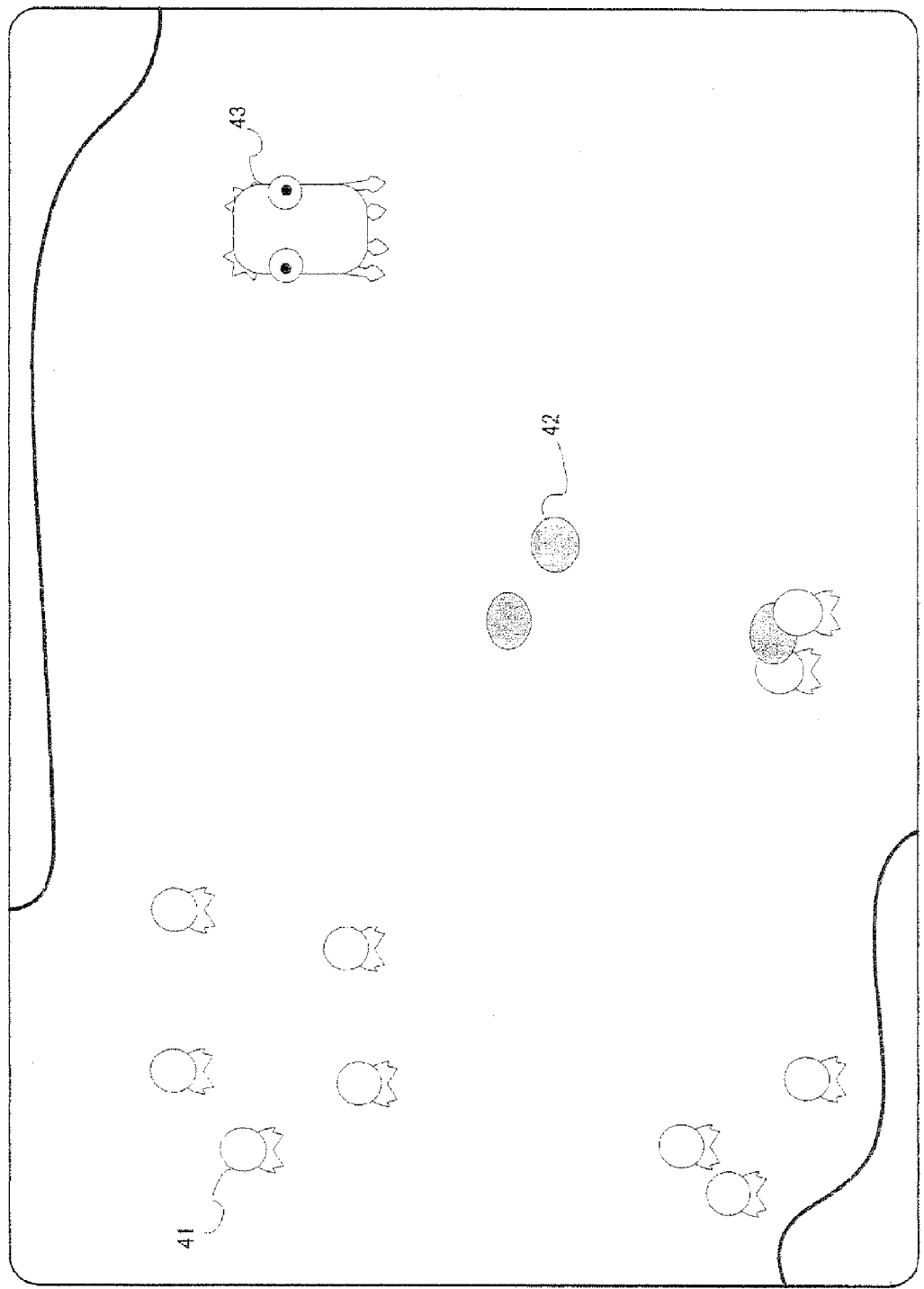
FIG. 3 shows an example of a game screen according to an embodiment of the present invention.
Figure 4:
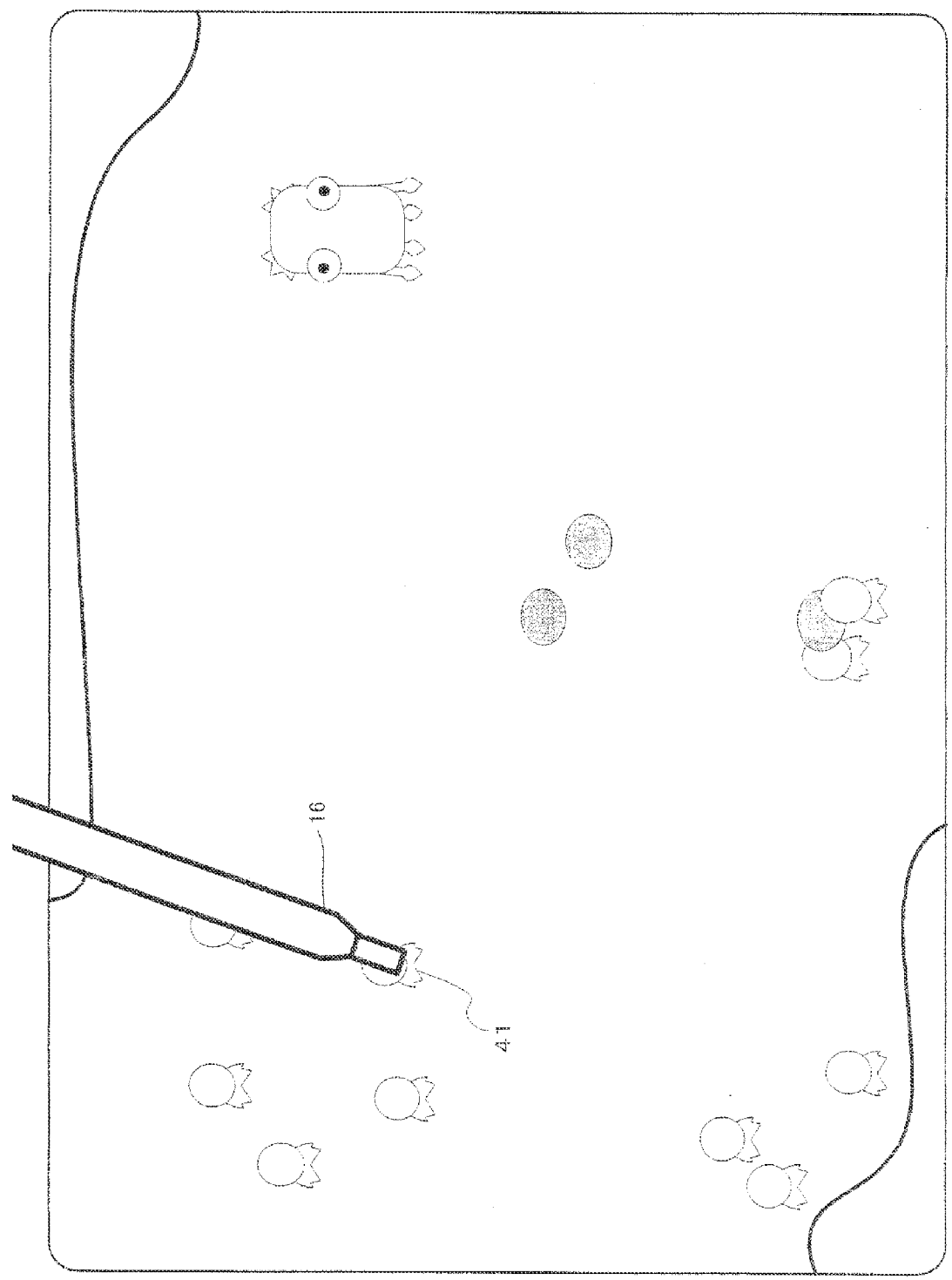
FIG. 4 is a diagram illustrating a state in which a single player character is designated.
Figure 5:
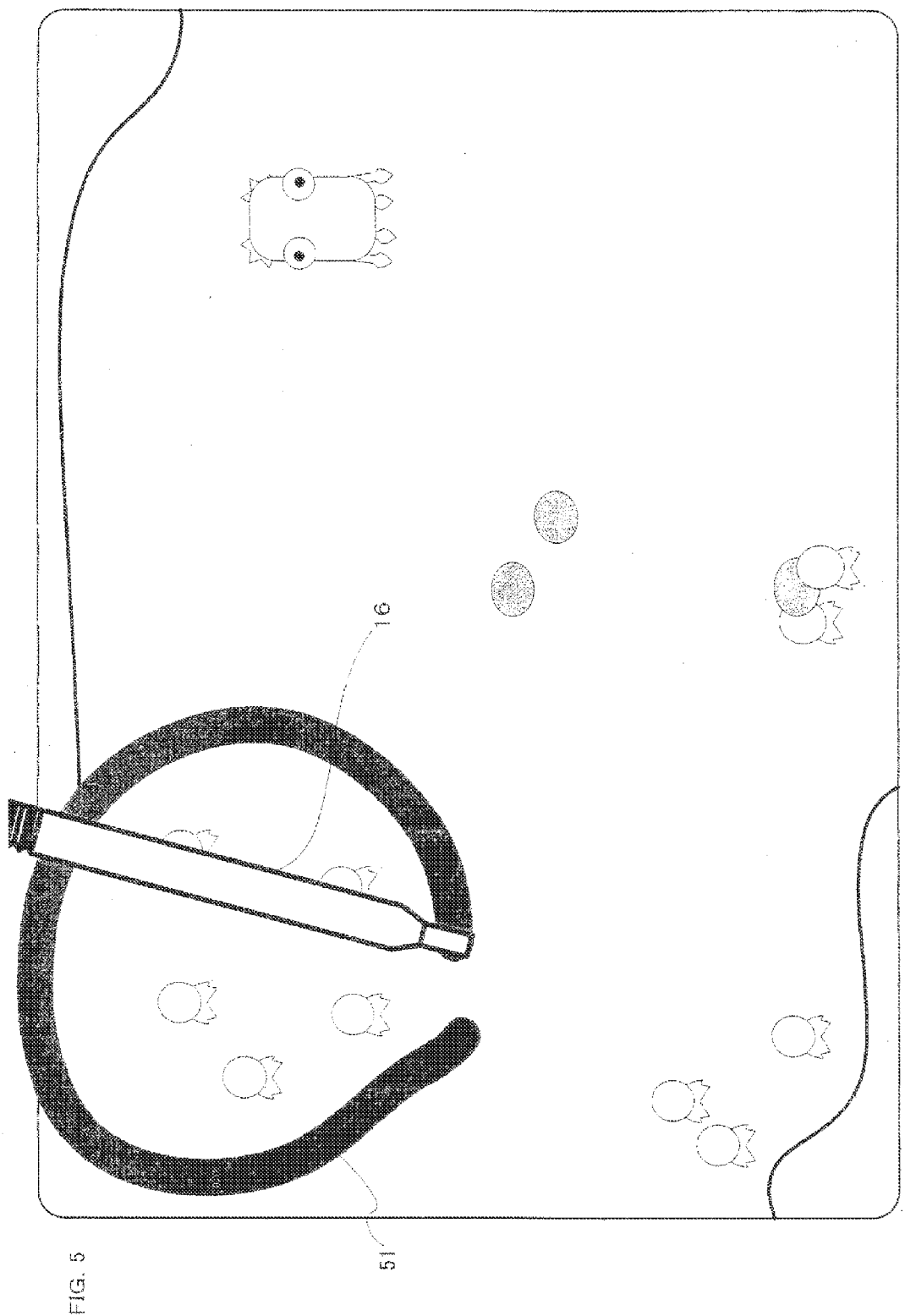
FIG. 5 is a diagram illustrating a state in which a plurality of player characters are designated.
Figure 6:
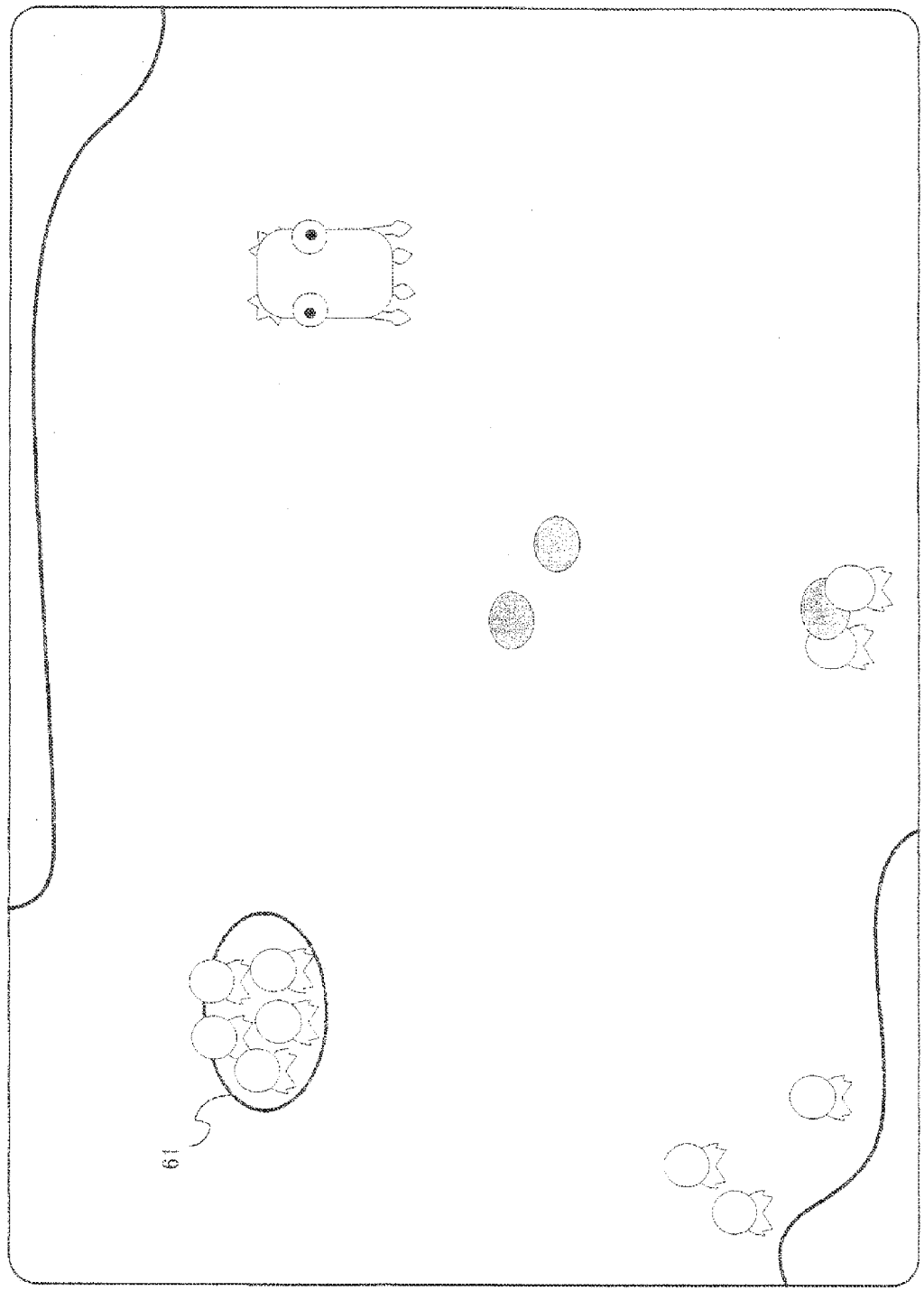
FIG. 6 is a diagram illustrating an array of a plurality of player characters.
Figure 7:
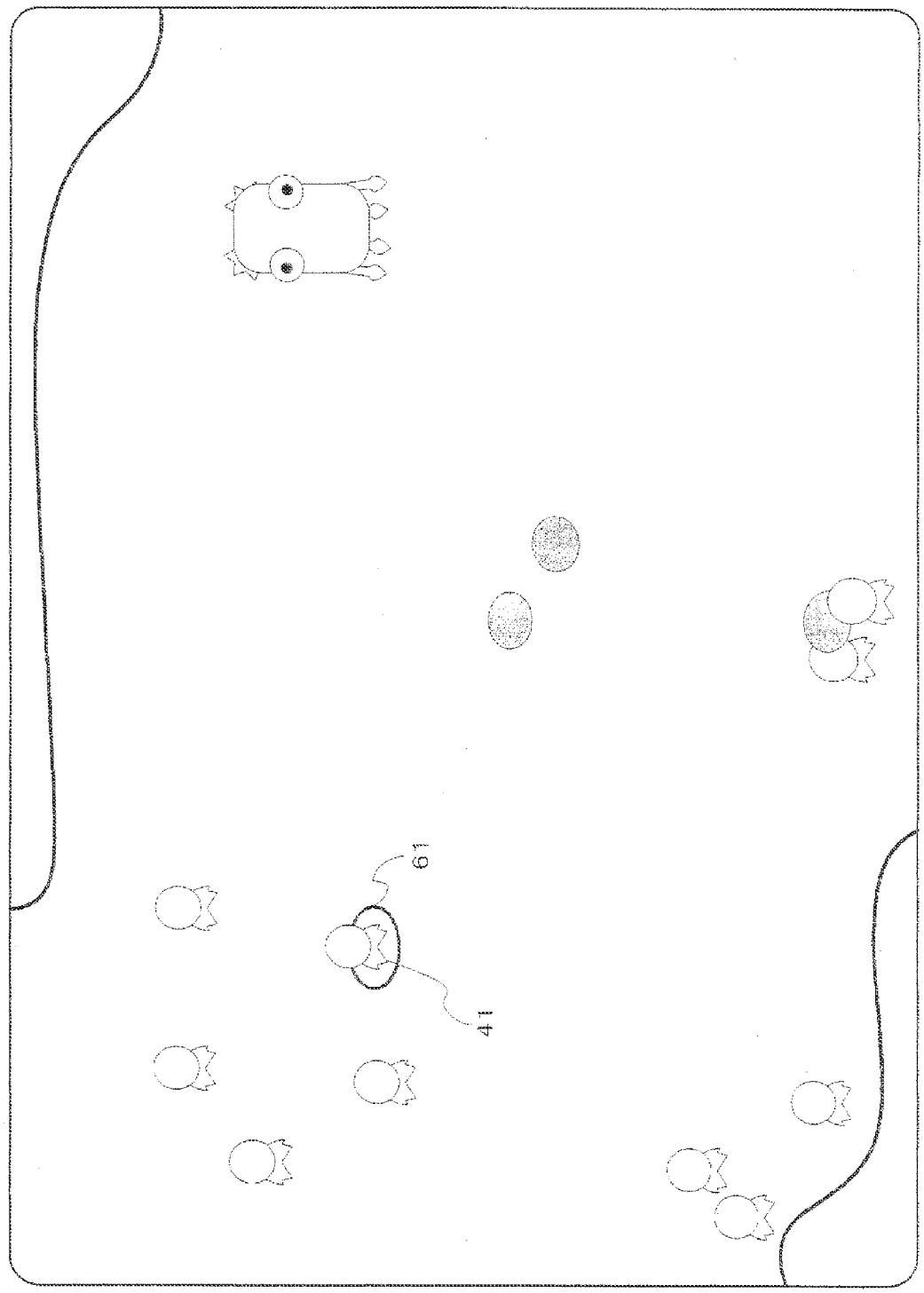
FIG. 7 is a diagram illustrating an array of a single player character.
Figure 8:
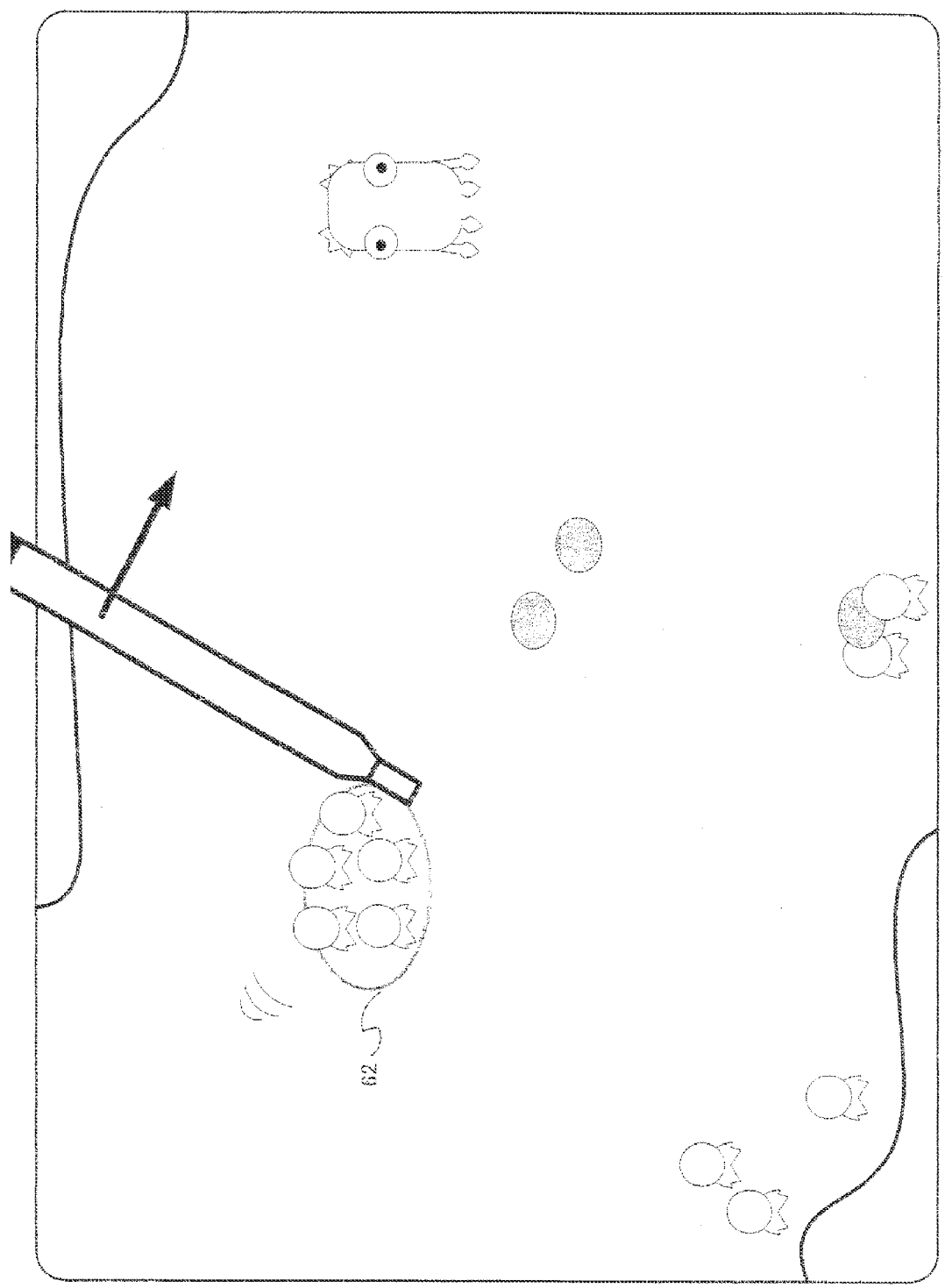
FIG. 8 is a diagram illustrating a state of the plurality of player characters being moved.
Figure 9:
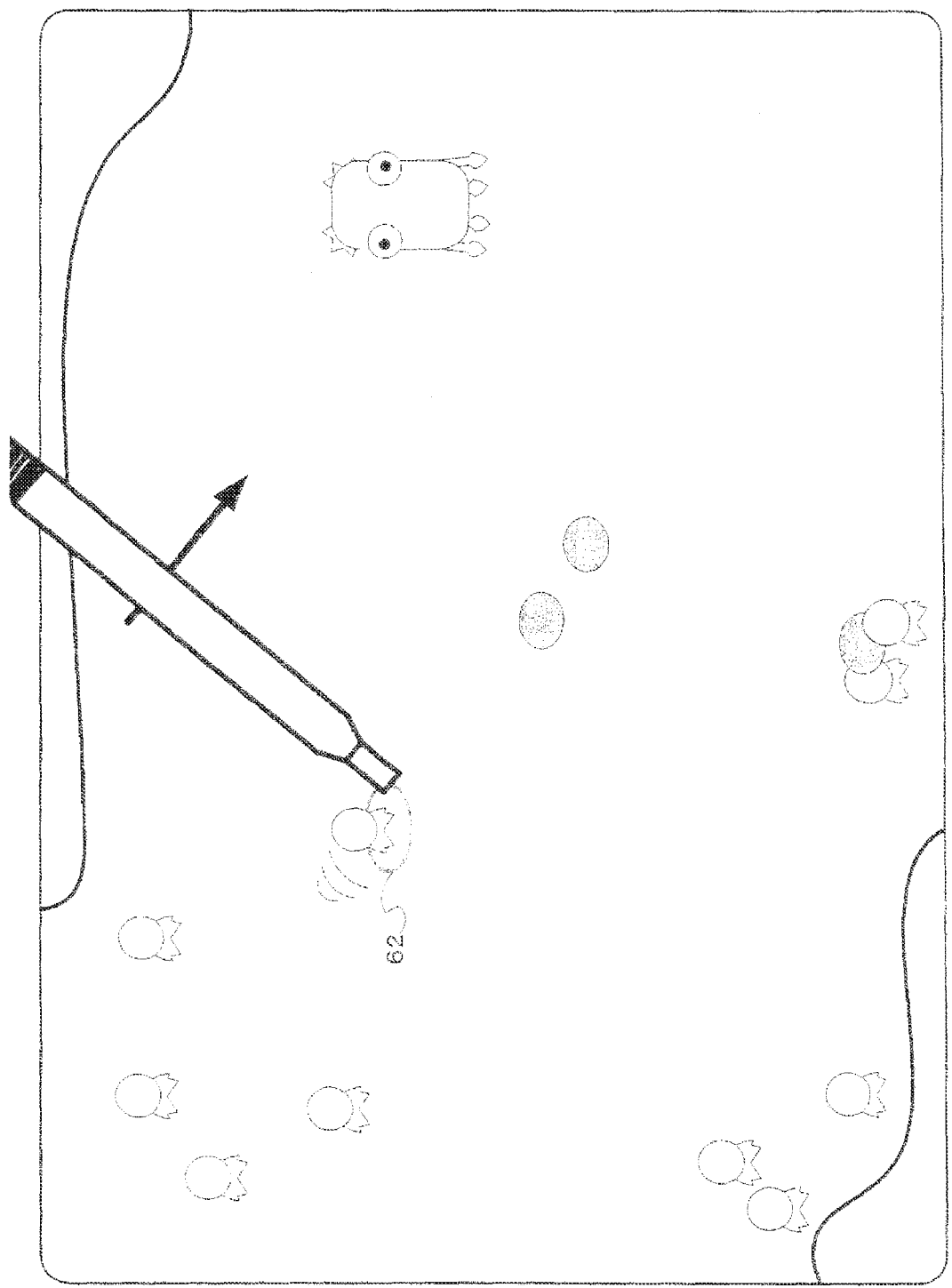
FIG. 9 is a diagram illustrating a state of the single player character being moved.

Next, with reference to FIGS. 3 to 12, an outline of the game according to the present embodiment will be described. FIG. 3 shows an example of a game screen according to the present embodiment. In the game, a plurality of player characters 41 are scattered on the screen. In an initial state, each of the player characters 41 individually performs an action according to its action program. In this state, a player performs an operation so as to designate, as targets to be controlled, one or more player characters 41 among the plurality of player characters 41 scattered on the screen. The designating operation can be performed in two methods. In one method, a single player character 41 is designated. In the other method, a plurality of player characters 41 are designated. When a single player character 41 is designated, the stick 16 or a finger is directly pressed against the player character 41 to be designated as shown in FIG. 4. On the other hand, when a plurality of player characters are designated, a group of the player characters to be designated is enclosed using the stick 16. Specifically, as shown in FIG. 5, a player moves the stick 16 on the touch panel 15. At this time, the player performs an operation for enclosing arbitral player characters 41 by a track obtained by moving the stick 16. The track indicates positions at which the player makes a series of inputs on the touch panel 15. Hereinafter, the track is referred to as an input track. When the group of the arbitral player characters is enclosed, the enclosed player characters are preferably gathered into an array. At this time, as shown in FIG. 6, the player character group is enclosed by a red circle 61 (hereinafter, referred to as an instruction waiting circle) for display. Hereinafter, a state of the player character group being enclosed by the instruction waiting circle is referred to as an instruction enabled state. Also when a single player character 41 is designated, the single player character 41 is enclosed by the instruction waiting circle. That is, when the single player character 41 is designated, an array of the single player character 41 is formed as shown in FIG. 7. When a player touches the array in the instruction enabled state, the instruction waiting circle 61 changes to a yellow circle 62 (hereinafter, referred to as an operation circle) so as to indicate the operation circle until the player removes the stick 16 from the touch panel 15. This operation circle indicates that the array is being moved and also indicates that the player is touching the touch panel 15. Hereinafter, a state of the operation circle 62 being indicated is referred to as an in-operation state. In the in-operation state, when the player moves the stick 16 touching the touch panel 15, the respective characters of the array start to move at respective speeds toward a position touched by the stick 16 (more specifically, a point which is in a game world and corresponds to the position touched by the stick 16) as a destination to move toward. Thus, the player can drag and move the array as shown in FIGS. 8 and 9. The player can move the array to various positions on the screen and cause the player character group of the array to perform various actions (hereinafter, referred to as "task"). The "task" includes, for example, attacking the opponent character 43, carrying fallen food 42 to a base, or adding to the array a player character 41 which does not belong to the array. In this game, the operations as described above are repeated to have the player characters 41 live in the game world.

Further, an input track indication 51 (a thick line shown in FIG. 5) indicating an input track is displayed in the game image. The input track indication 51 is displayed at positions which are on the display screen and correspond to positions at which a series of inputs are made on the touch panel 15. That is, the input track indication 51 is displayed at positions to which a player actually moves the stick 16 on the touch panel 15. FIG. 5 shows that the input track is near-circular. When seeing the input track indication 51, the player can clearly and intuitively recognize the input track made by the player's input operation. Accordingly, the player can quickly recognize whether or not the player character 41 and the like are appropriately enclosed, and the like. The input track indication 51 is displayed in a certain time period and automatically erased.

Figure 10:
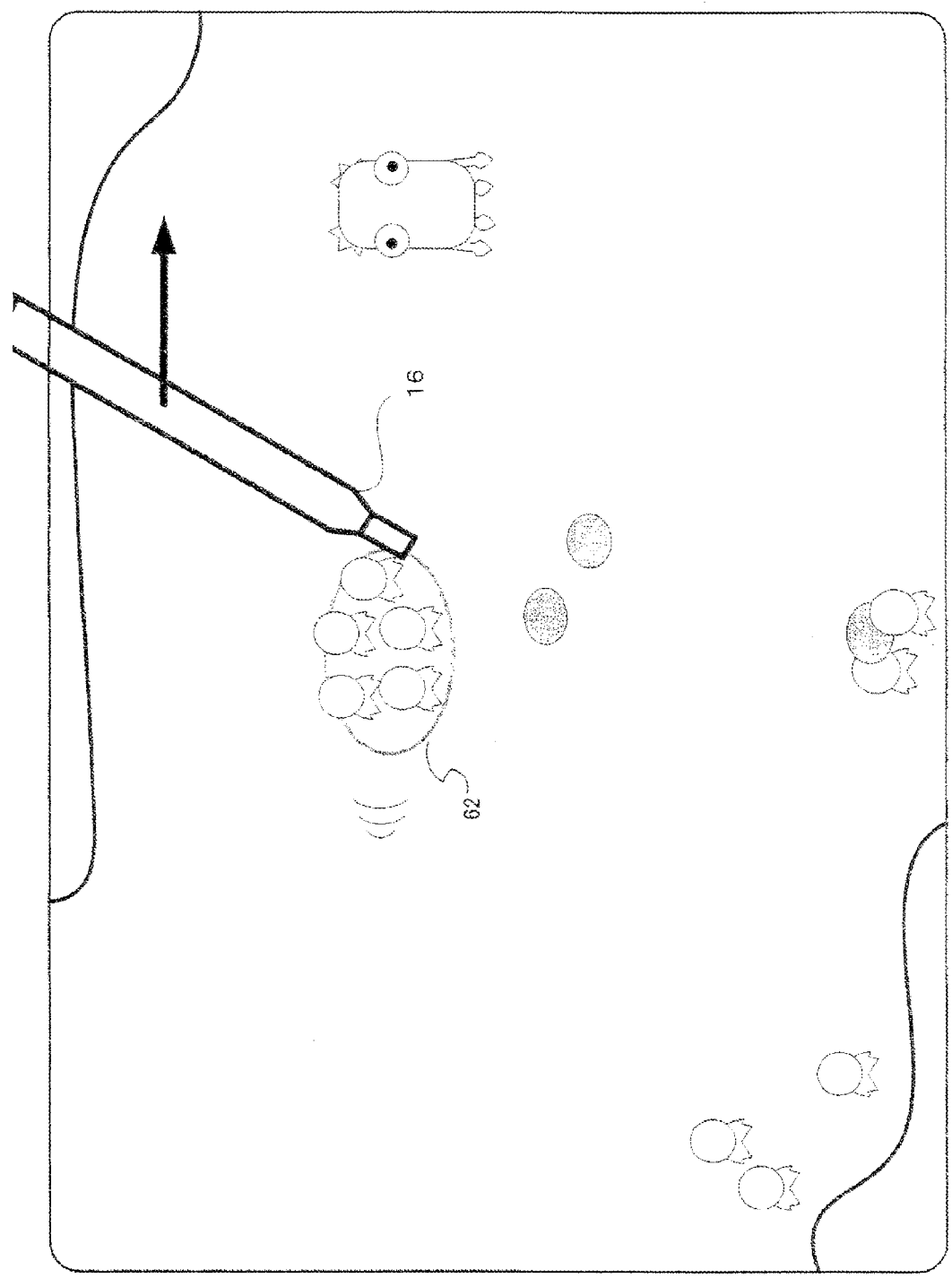
FIG. 10 is a diagram illustrating a state of the array being moved.
Figure 11:
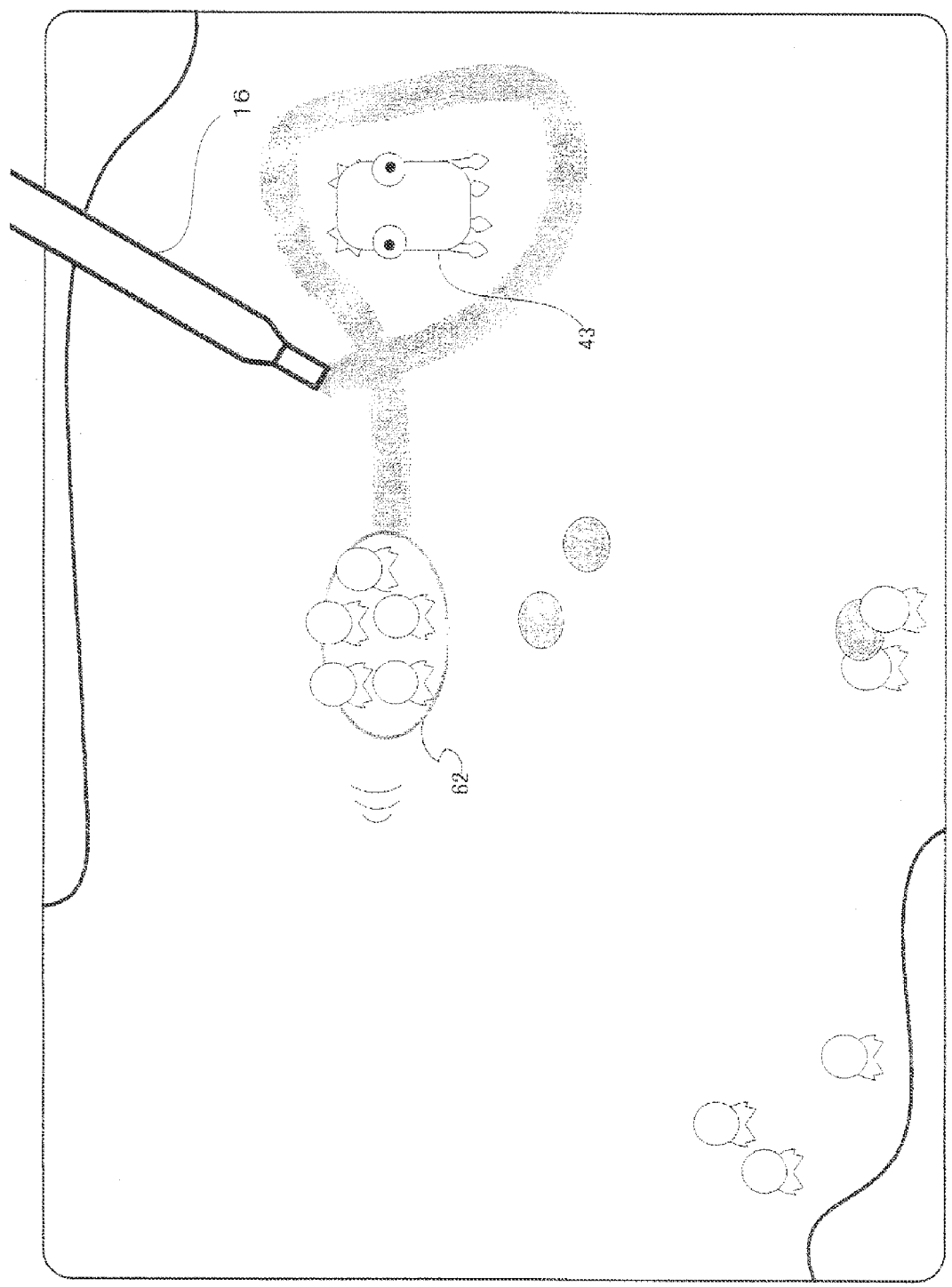
FIG. 11 is a diagram illustrating an operation for enclosing an opponent character 43 with a stick 16 touching a touch panel.
Figure 12:
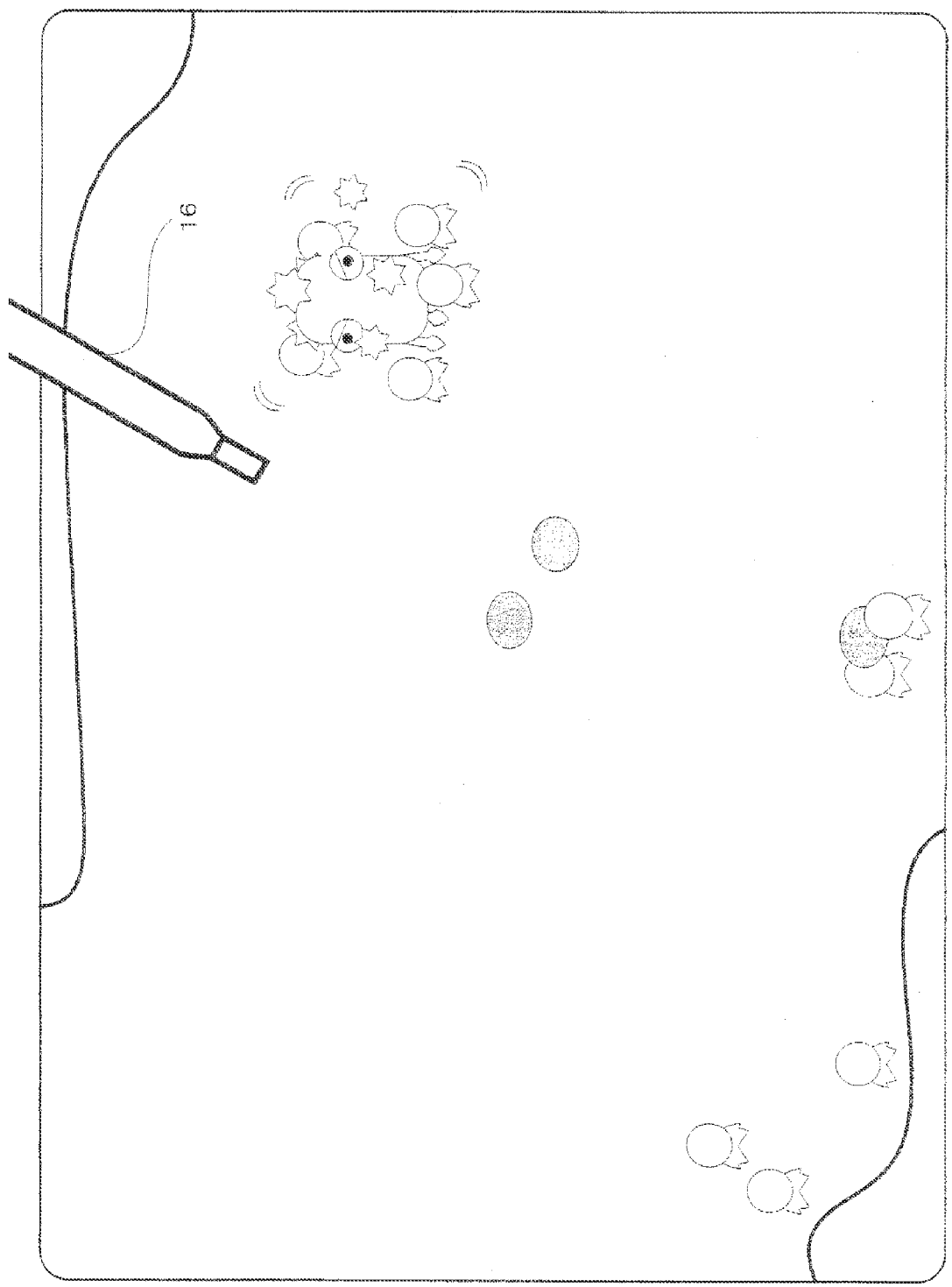
FIG. 12 is a diagram illustrating a state of the opponent character 43 being attacked.
Figure 13:
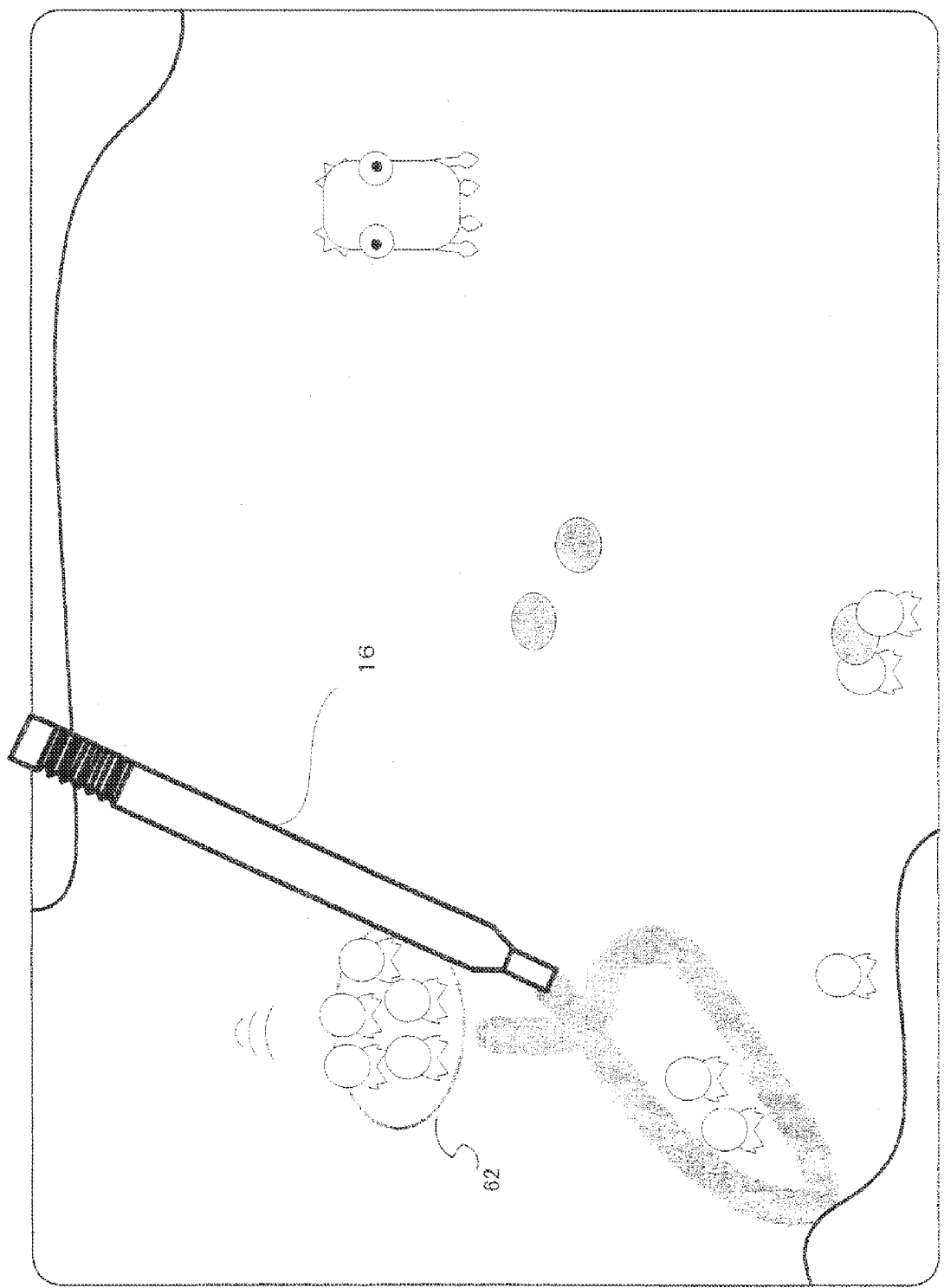
FIG. 13 is a diagram illustrating an operation for enclosing the player characters 41 which do not belong to the array.
Figure 14:
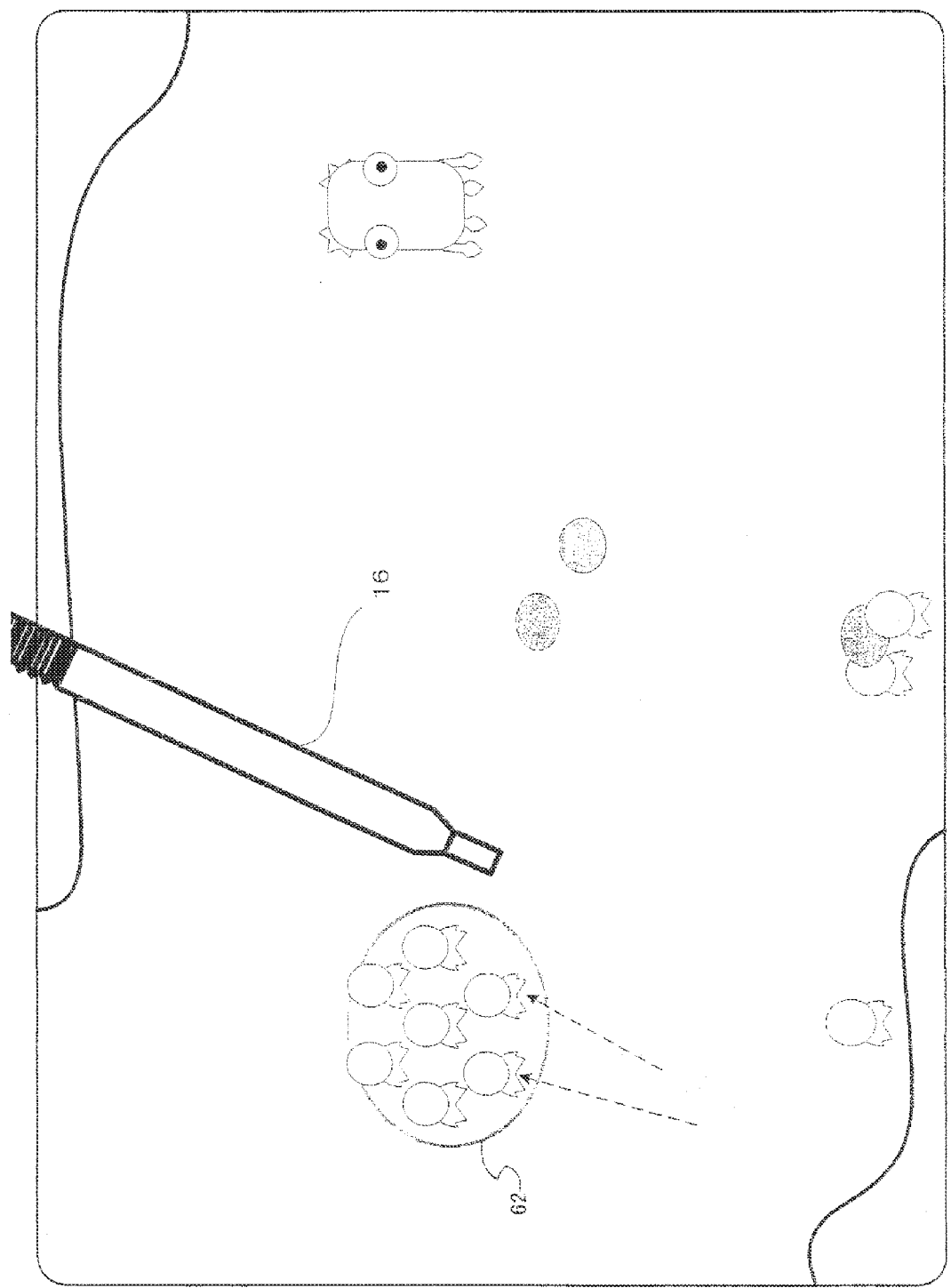
FIG. 14 is a diagram illustrating a state of the enclosed player characters 41 being added to the array.

Further, in the present embodiment, when the player characters are caused to perform the "task", it is necessary to designate an object on which the "task" is performed, that is, a target on which the "task" is performed (hereinafter, referred to as a task target), among various objects on the screen. The method for designating the task target will be described with reference to FIGS. 10 to 14. FIG. 10 is a diagram illustrating a state of the aforementioned array being moved. When in this state a predetermined object is enclosed using the stick 16 which is touching the touch panel 15, a predetermined "task" on the object is started. FIG. 11 is a diagram illustrating an operation of enclosing the opponent character 43 with the stick 16 touching the touch panel. In this case, as shown in FIG. 12, attack on the opponent character 43 will be started. Further, when the player character 41 which does not belong to the array is enclosed as shown in FIG. 13, the enclosed player character 41 can be added to the array as shown in FIG. 14. Thus, in the present embodiment, when during the movement of the array an object is enclosed using the stick 16, the characters of the array and the enclosed object can be caused to perform actions according to what the enclosed object is.

Further, in the instruction enabled state, that is, in a state of the array being waiting for the player's instruction, the player character 41 which does not belong to the array is enclosed using the stick 16, thereby adding the enclosed player character 41 to the array.

Figure 15:
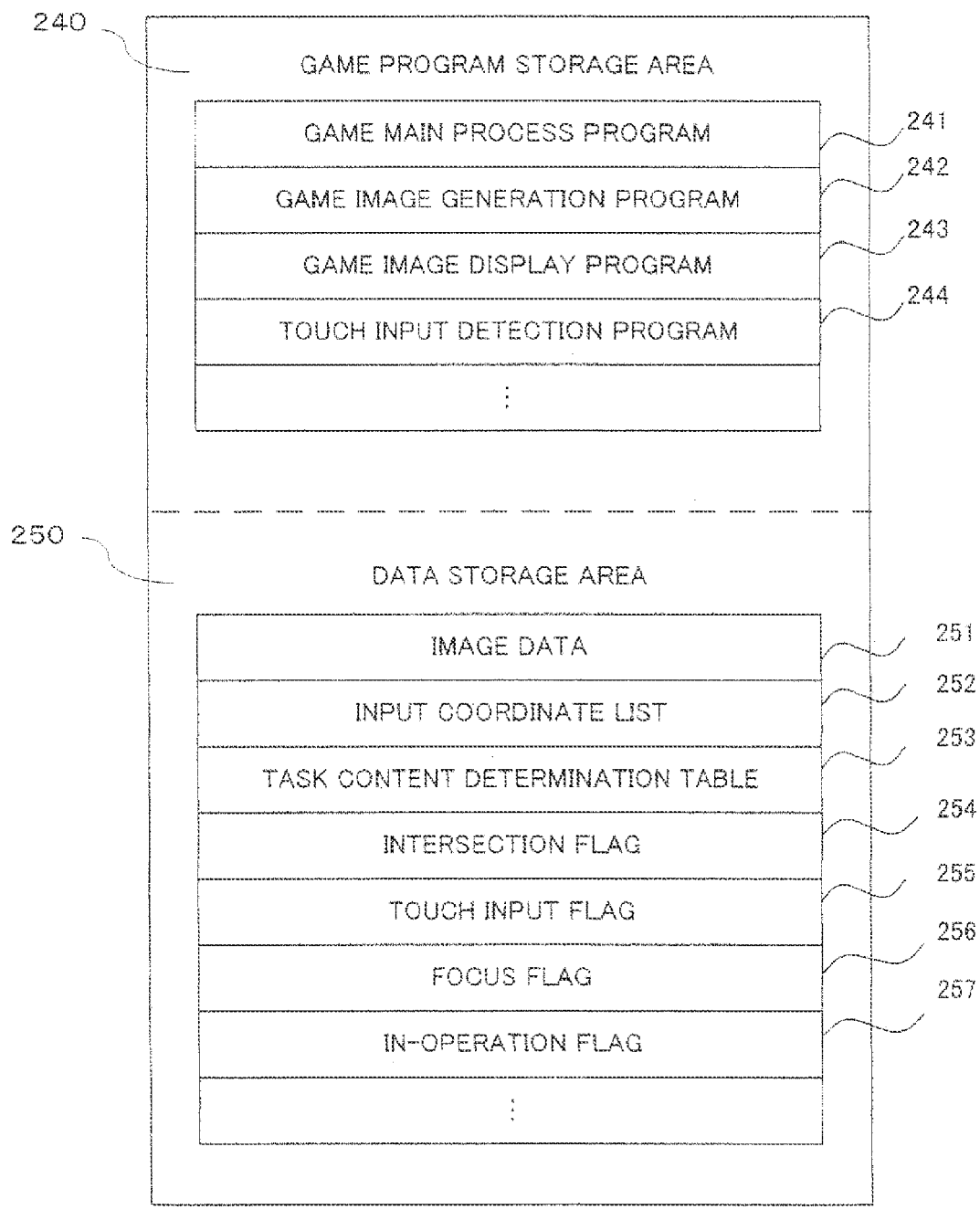
FIG. 15 is a diagram illustrating a memory map of a RAM 24 shown in FIG. 2.

Next, data to be stored in the RAM 24 during the game process will be described. FIG. 15 is a diagram illustrating a memory map in the RAM 24 shown in FIG. 2. In FIG. 15, the RAM 24 includes a game program storage area 240 and a data storage area 250. The game program storage area 240 stores a game program executed by the CPU core 21. The game program includes: a game main process program 241; a game image generation program 242; a game image display program 243; and a touch input detection program 244.

The game main process program 241 is a program for processing the aforementioned game main routine. The game image generation program 242 is a program for generating, using image data 251 described below, game images such as the player character 41, the opponent character 43, a non-player character other than the opponent character and a background object. The game image display program 243 is a program for displaying the game images generated by the game image generation program 242 on the first LCD 11 and the second LCD 12.

The touch input detection program 244 detects whether or not a player is making a touch input at regular time intervals (for each frame in the present embodiment) so as to control whether the touch input flag 255 described below is to be set as ON or OFF. The touch input detection program 244 is also a program for (temporarily) storing, when a touch input is being made, coordinate data corresponding to coordinates detected according to the touch input, in an input coordinate list 252 in order of time. Here, whether or not the touch input is being made is determined according to whether or not the coordinate data corresponding to the coordinates detected from the touch input is being inputted from the touch panel 15.

The game program storage area 240 stores a sound reproduction program, a backup program and the like, which are not shown. The sound reproduction program is a program for reproducing a sound required for the game by using sound data. The backup program is a program for storing (saving), in the RAM 24 of the memory card 17, data (in-progress data or result data of the game) generated according to progress of the game based on an instruction from a player or at a predetermined timing (event).

The data storage area 250 stores data such as image data 251, an input coordinate list 252, and a task content determination table 253, and flags such as an intersection flag 254, a touch input flag 255, a focus flag 256, and an in-operation flag 257.

The image data 251 is data, such as polygon data and texture data, used for generating game images such as a player character, a non-player character like an opponent character, a background object, and a predetermined character.

The input coordinate list 252 is a collection of groups each including an input order and the coordinate data. In the present embodiment, coordinate data inputted by a player is detected at intervals of a predetermined unit time. As shown in FIG. 16, the coordinate data is stored in the RAM 24 as a list while the player is making a series of inputs, that is, until the player's finger or the like is not removed from the touch panel.

The task content determination table 253 is a table used for determining, based on a type of a locked-on object, a content of a task to be actually performed. As shown in FIG. 17, the task content determination table 253 is a collection of groups each including a type of an object, content of the task process and an order of priority.

The intersection flag 254 is a flag indicating whether or not an input track indicated according to the input coordinate list 252 intersects itself, that is, whether or not an enclosed area is formed. When it is determined, in the intersection determination process described below, that the input track forms the enclosed area, the intersection flag 254 is set as ON.

The touch input flag 255 is a flag indicating a touch input state, "ON" or "OFF", and the touch input flag 255 switches between "ON" and "OFF" according to the touch input detection program 244.

The focus flag 256 is a flag indicating a character designated by a player, that is, a character to be controlled by the player, from among a plurality of player characters 41 displayed on the screen. Therefore, each player character has its focus flag 256 set as "ON" or "OFF". The player character designated by a player has its focus flag 256 set as "ON" while the player character which is not designated by a player has its focus flag 256 set as "OFF". Further, the characters having their focus flags 256 set as "ON" form an array. That is, the characters each having its focus flag 256 set as "ON", which form an array, are enclosed by the instruction waiting circle 61.

The in-operation flag 257 is a flag indicating whether or not any operation is being performed using the stick 16 on the character having its focus flag 256 set as ON (hereinafter, referred to as a focus character). When the in-operation flag 257 is set as "ON", the operation circle 62 is indicated. When the in-operation flag 257 is set as "OFF", a player is not controlling the focus character.

FIG. 18 shows a table providing a listing of contests of the respective flags for reference. Stored in the data storage area 250 are sound data used for outputting a sound required for the game, data generated according to progress of the game such as in-progress data or result data of the game, a flag such as an event flag, and the like, which are not shown.

Figure 19:
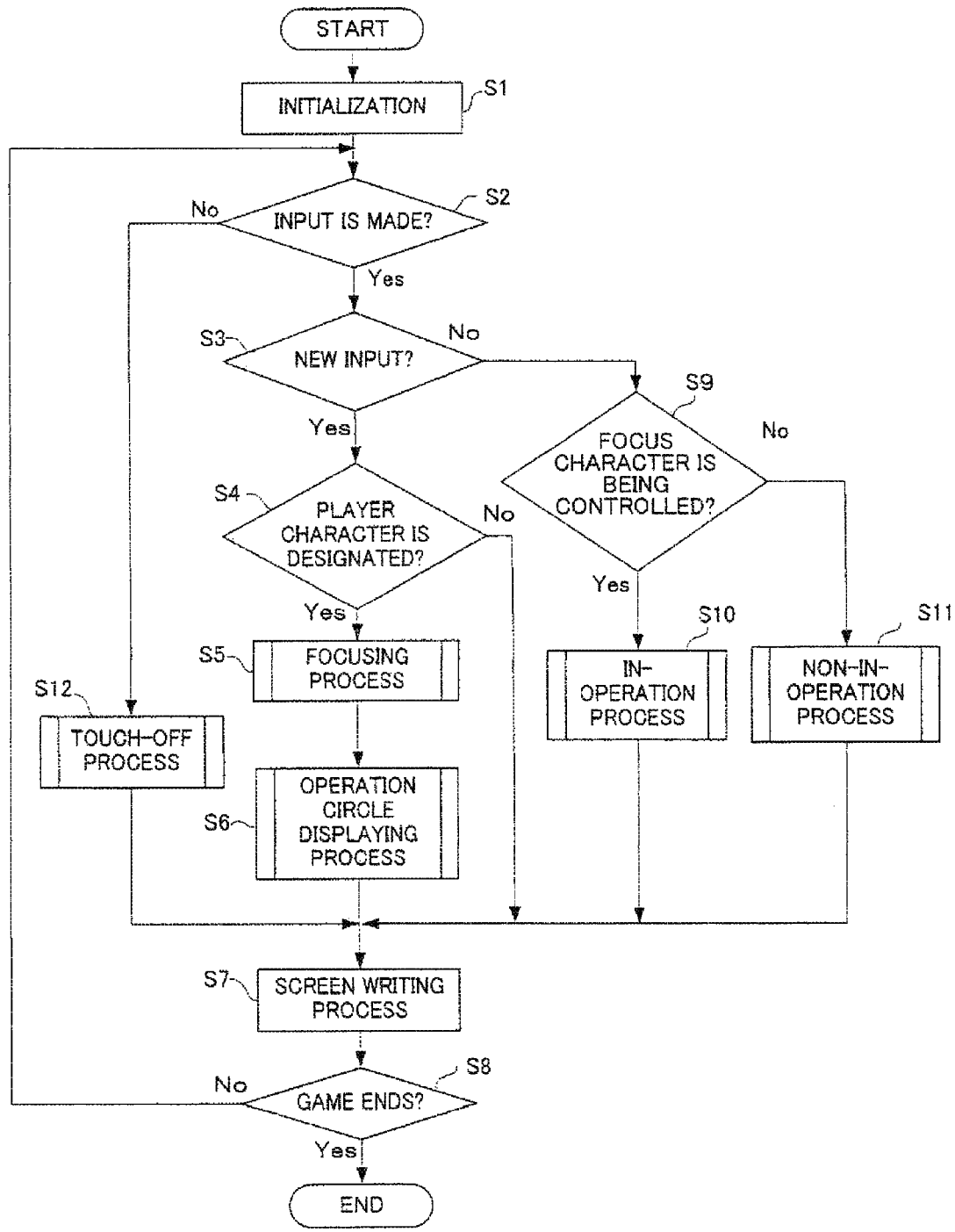
FIG. 19 is a flow chart illustrating a flow of a game process executed by the game apparatus 10.

Next, with reference to FIGS. 19 to 24, a flow of the game process executed by the game apparatus 10 will be described. FIG. 19 is a flow chart illustrating a flow of the game process executed by the game apparatus 10. When a power supply of the game apparatus 10 is turned on, the CPU core 21 of the game apparatus 10 executes a boot program stored in the boot ROM not shown so as to initialize each unit such as the RAM 24. The game program stored in the memory card 17 is loaded to the RAM 24, and the execution of the game program is started. Consequently, a game image is displayed on the first LCD 11 via the first GPU 26, thereby starting the game in step S1.

Next, it is detected in step S2 whether or not a touch input is being made. That is, coordinate data inputted from the touch panel 15 is detected for. As a result, when no touch input is detected as being made (No in step S2), a touch-off process described below is performed in step S12. On the other hand, when the touch input is detected as being made (Yes in step S2), the touch input position is stored in the input coordinate list 252. That is, a series of coordinate data inputted from the touch panel 15 are temporarily stored in the input coordinate list 252 in order of time. In the subsequent step S3, it is determined whether or not the touch input flag is set as "ON", that is, it is determined whether the touch panel is being kept pressed (hereinafter, referred to as continuous input) or pressing on the touch panel has just started (hereinafter, referred to as new input).

When a determination result of step S3 is a new input (Yes in step S3), it is determined in step S4 whether or not one or more player characters 41 displayed on the screen are designated. In step S4, whether or not the player characters 41 are designated is determined according to whether or not an input coordinate position is within a hit determination area for the player character 41. The hit determination area for the player character is defined in the initialization process. Further, when the array has already been formed, it is determined whether or not the input coordinate position is within a hit determination area for the array. The hit determination area for the array is defined in the touch-off process described later (step S12).

Figure 20:
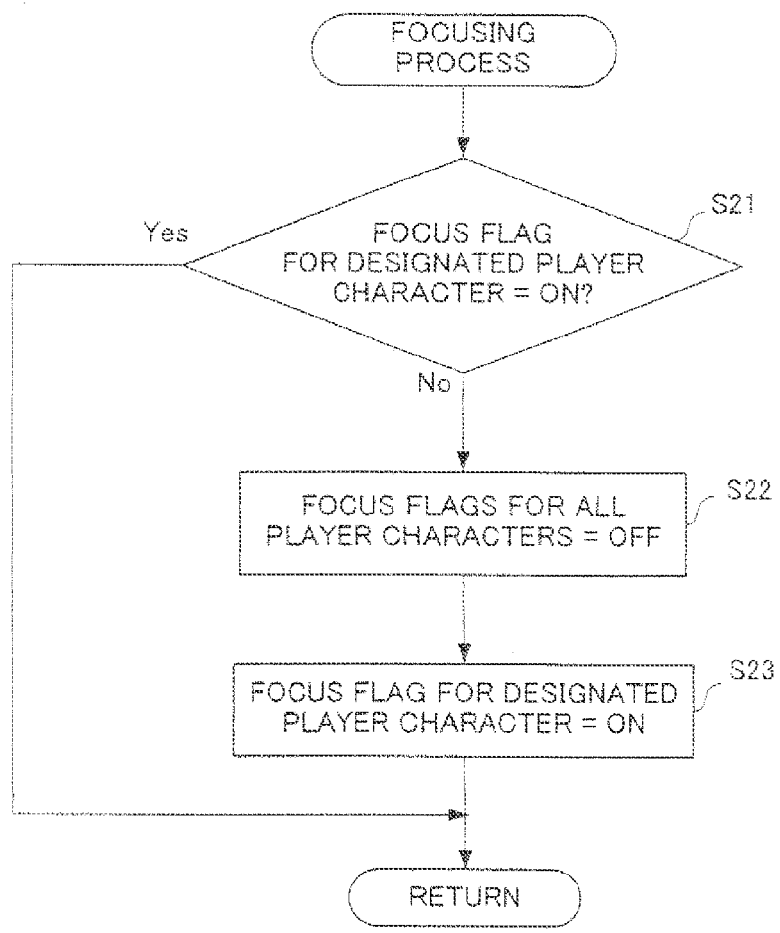
FIG. 20 is a flow chart illustrating in detail a focusing process of step S5 shown in FIG. 19.

When it is determined in step S4 that no player character 41 is designated (No in step S4), the process is advanced to a screen writing process of step S7. On the other hand, it is determined in step S4 that one or more player characters 41 are designated (Yes in step S4), a focusing process is performed in step S5 in which the designated player character 41 is set as a focus character. FIG. 20 is a flow chart illustrating in detail the focusing process of step S5. Here, by setting the focus flag 256 for the designated player character 41 as ON, the designated player character 41 is set as the focus character (a character which can be controlled by a player).

In FIG. 20, initially, it is determined in step S21 whether or not the focus flag 256 for the designated player character is set as "ON". When it is determined that the focus flag 256 is set as "OFF" (No in step S21), the focus flags 256 for all the player characters 41 are set as "OFF" in step S22. This is because some player characters may have their focus flags 256 set as "ON", and therefore the focus flags 256 for all the player characters 41 are reset to "OFF", that is, all the desig-nations are cancelled. Next, the focus flag 256 for the designated player character 41 is set as "ON" in step S23. Thereby, even when some player characters 41 have already been designated as the focus characters, only the player character 41 which is currently designated can be designated as the focus character. On the other hand, when it is determined in step S21 that the focus flag 256 has already been set as "ON" (Yes in step S21), the player character which has already been set as the focus character of an array is designated, and therefore the focusing process is ended. Until the player starts to control the focus characters, the focus characters wait for the player's operation without moving.

Figure 21:
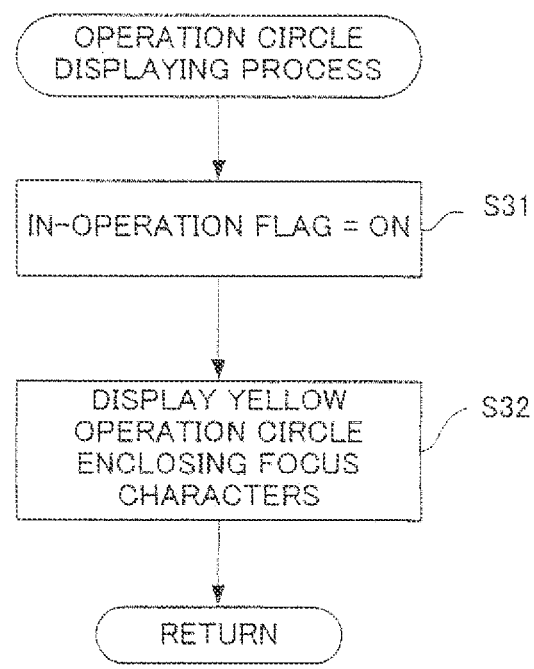
FIG. 21 is a flow chart illustrating in detail an operation circle indication process of step S6 shown in FIG. 19.

Returning to FIG. 19, in the subsequent step S6, a process of displaying the operation circle 62 indicating that the focus character is being controlled is performed. FIG. 21 is a flowchart illustrating in detail an operation circle displaying process of step S6. In FIG. 21, initially, the in-operation flag 257 is set as "ON" in step S31. Next, the operation circle 62 having the focus character at the center thereof is generated in step S32. This is the end of the operation circle displaying process.

Returning to FIG. 19, in the subsequent step S7, the screen writing process is performed. Thereby, the operation circle 62 and the like are displayed. In the subsequent step S8, it is determined whether or not the game is to be ended. When a game end condition is not satisfied (No in step S8), the process is returned to step S2. On the other hand, when the game end condition is satisfied (Yes in step S8), the game process is ended.

Next, a process (step S12) performed when it is determined in step S2 that touch input is not made (No in step S2) will be described. The process is performed when the stick 16 is removed from the touch panel 15, that is, when a touch-off is performed. Here, the input coordinate list 252 is initialized. Further, when the in-operation flag 257 is set as ON, the in-operation flag 257 is set as OFF, and the operation circle 62 is erased. Instead of the operation circle 62, the instruction waiting circle 61 is generated. At this time, an area enclosed by the instruction waiting circle 61 is set as the hit determination area for the array. That is, when a player is touching the array (corresponding to the focus characters or an area enclosed by the instruction waiting circle 61), the yellow operation circle 62 is displayed and the array can be moved. At a time of the stick 16 being removed by the player, the yellow operation circle 62 is changed to the red instruction waiting circle 61, and at the same time the array stops and waits for the player's operation. On the other hand, when the in-operation flag 257 is set as OFF and focus characters form the array, the instruction waiting circle 61 is generated so as to enclose the focus characters. When no focus character is present, the touch-off process is ended. This is the end of the touch-off process of step S12 shown in FIG. 19.

Next, a process performed when it is determined in step S3 that the operation is being continued (No in step S3) will be described. Initially, it is determined in step S9 whether or not the in-operation flag 257 is set as ON. When it is determined in step S9 that the in-operation flag 257 is set as ON (Yes in step S9), it indicates that the focus character (array) is being controlled by the player. In this case, an in-operation process of step S10 described below is performed.

Figure 22:
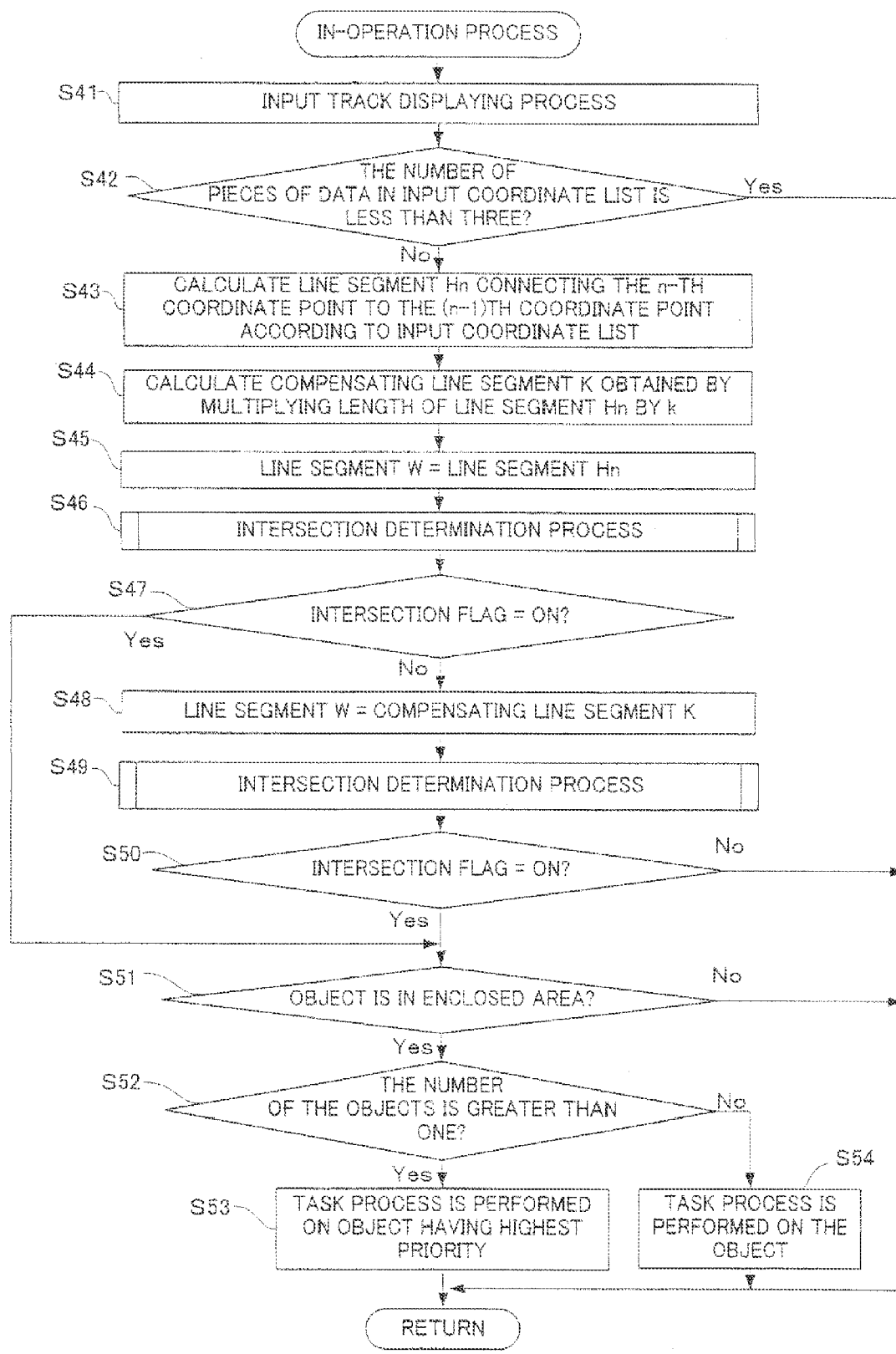
FIG. 22 is a flow chart illustrating in detail an in-operation process of step S10 shown in FIG. 19.

A process of step S10 will be described with reference to FIGS. 22 to 27. FIG. 22 is a flow chart illustrating in detail the in-operation process of step S10. In the in-operation process, it is determined whether or not one or more objects are enclosed by an input track obtained by making a series of inputs using the stick 16, that is, whether or not the input track intersects itself to form an enclosed area, and thereafter an action process is performed according to the determination result.

In FIG. 22, initially, a process of displaying the input track indication 51 on the screen is performed in step S41. The process of step S41 does not directly relate to the game program disclosed herein and step S41 is not described. Next, in step S42, it is determined whether or not the number of pieces of coordinate data contained in the input coordinate list 252 is less than three. When it is determined that the number of pieces of coordinate data is less than three (Yes in step S42), the in-operation process is ended. This is because at least two line segments cannot be obtained in this case. The minimum number of line segments required in the intersection determination process for input track described later is two. On the other hand, when it is determined in step S42 that the number of pieces of coordinate data contained in the input coordinate list 252 is three or more (No in step S42), the process is advanced to the next step S43.

In step S43, a line segment Hn is obtained by connecting the (n−1)th coordinate point to the n-th coordinate point according to the input coordinate list 252. Here, the line segment refers to a line connecting two coordinate points. In the subsequent step S44, a compensating line segment K is calculated by multiplying a length of the line segment Hn by k, and the compensating line segment K having been calculated is temporality stored in the RAM 24. Here, the line segment Hn and the compensating line segment K have a same starting coordinate point but different end coordinate points from each other. That is, the compensating line segment K is obtained by extending the line segment Hn. k is a predetermined value.

Next, in step S45, the line segment Hn calculated in step S43 is set as a line segment W which is an argument used for the intersection determination process described below. Subsequently, in step S46, it is determined whether or not the line segment W intersects the input track, that is, whether or not the input track forms an enclosed area.

Figure 23:
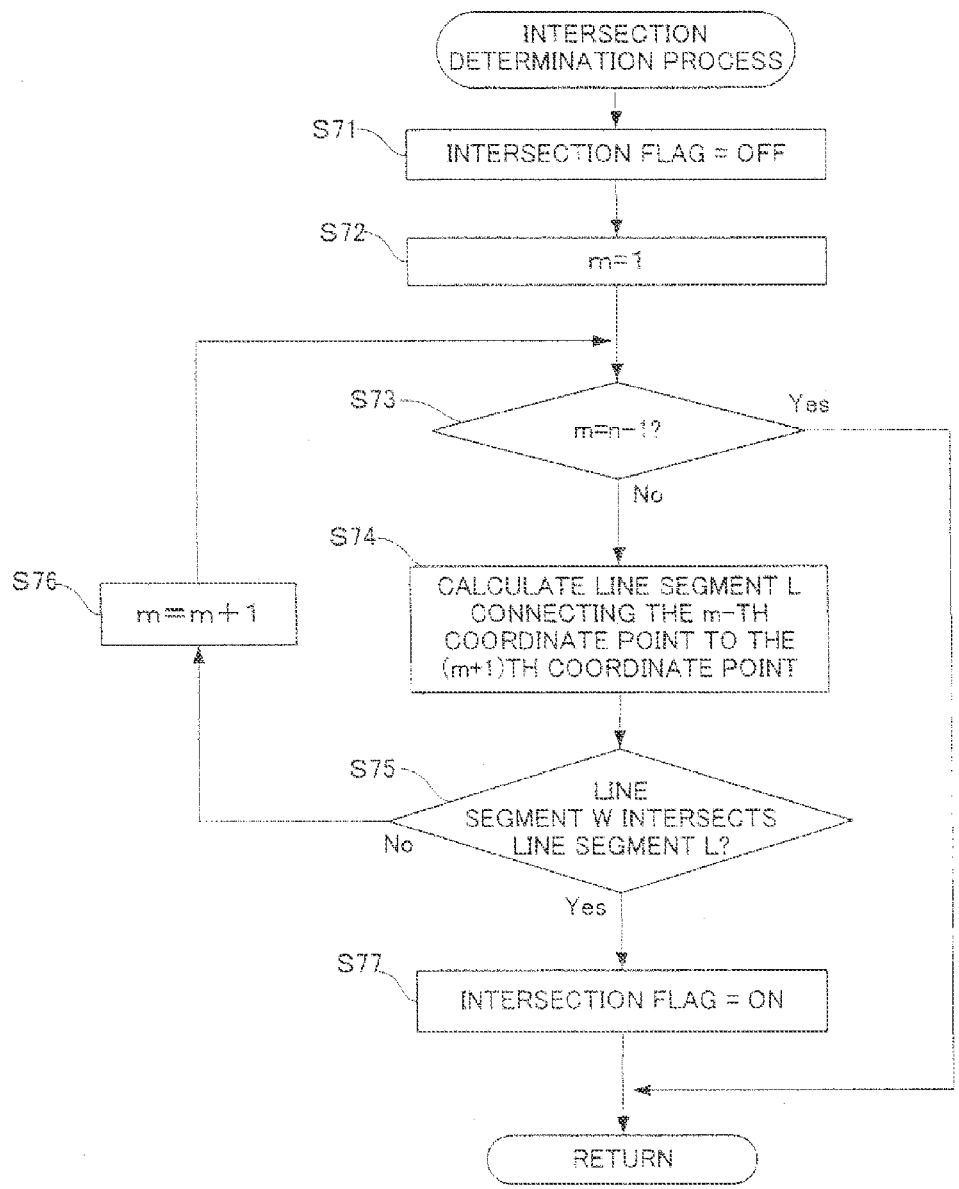
FIG. 23 is a flow chart illustrating in detail an intersection determination process of steps S45 and S49 shown in FIG. 22.

FIG. 23 is a flow chart illustrating in detail the intersection determination process of step S46. In the intersection determination process, it is determined whether or not a line segment (line segment W) passing through a most recently inputted coordinate point intersects another line segment among a plurality of line segments each connecting two coordinate points adjacent to each other according to the input coordinate list 252.

In FIG. 23, initially, the intersection flag indicating whether or not the input track intersects itself (that is, whether or not an enclosed area is formed) is set as OFF in step S71. Subsequently, in step S72, a variable m indicating an input order in the input coordinate list is set to "1". Next, it is determined in step S73 whether or not a value of m is equal to a value of the input order n−1 in the input coordinate list 252. That is, it is determined in step S73 whether or not the value of m is equal to a value of the second last input order in the input coordinate list. When it is determined that the value of m is equal to the value of the input order n−1 (Yes in step S73), the intersection determination process is ended. Thereby, a determination as to whether or not a line segment passing through a most recently inputted coordinate point intersects the same line segment passing through the most recently inputted coordinate point is avoided. On the other hand, when it is determined that the value of m is not equal to the value of the input order n−1 (No in step S73), a line segment L connecting the m-th coordinate point to the (m+1)th coordinate point is calculated according to the input coordinate list 252 in step S74. Next, in step S75, it is determined whether or not the line segment L intersects the line segment W. For example, it is determined whether or not an intersection of the line segment L and the line segment W can be detected, thereby determining whether or not the line segment L intersects the line segment W. The method for determining whether or not the line segment L intersects the line segment W is not restricted thereto. For example, when two coordinate points of the line segment W are on both sides of the line segment L, respectively, that is, the line segment L is positioned between the two coordinate points of the line segment W, it can be determined that the line segment L intersects the line segment W.

When it is determined in step S75 that the line segment L does not intersect the line segment W (No in step S75), m is incremented by one in step S76 and the process is returned to step S73. That is, firstly, it is determined whether or not a line segment connecting a first coordinate point to a second coordinate point intersects the line segment W according to the input coordinate list. Subsequently, it is determined whether or not a line segment connecting a second coordinate point to a third coordinate point intersects the line segment W according to the input coordinate list, then it is determined whether or not a line segment connecting a third coordinate point to a fourth coordinate point intersects the line segment W according to the input coordinate list, and thereafter the determination is performed using the subsequent coordinate points in the same manner. On the other hand, when it is determined that the line segment L intersects the line segment W (Yes in step S75), the intersection flag is set as ON in step S77. This is the end of the intersection determination process.

Figure 24:
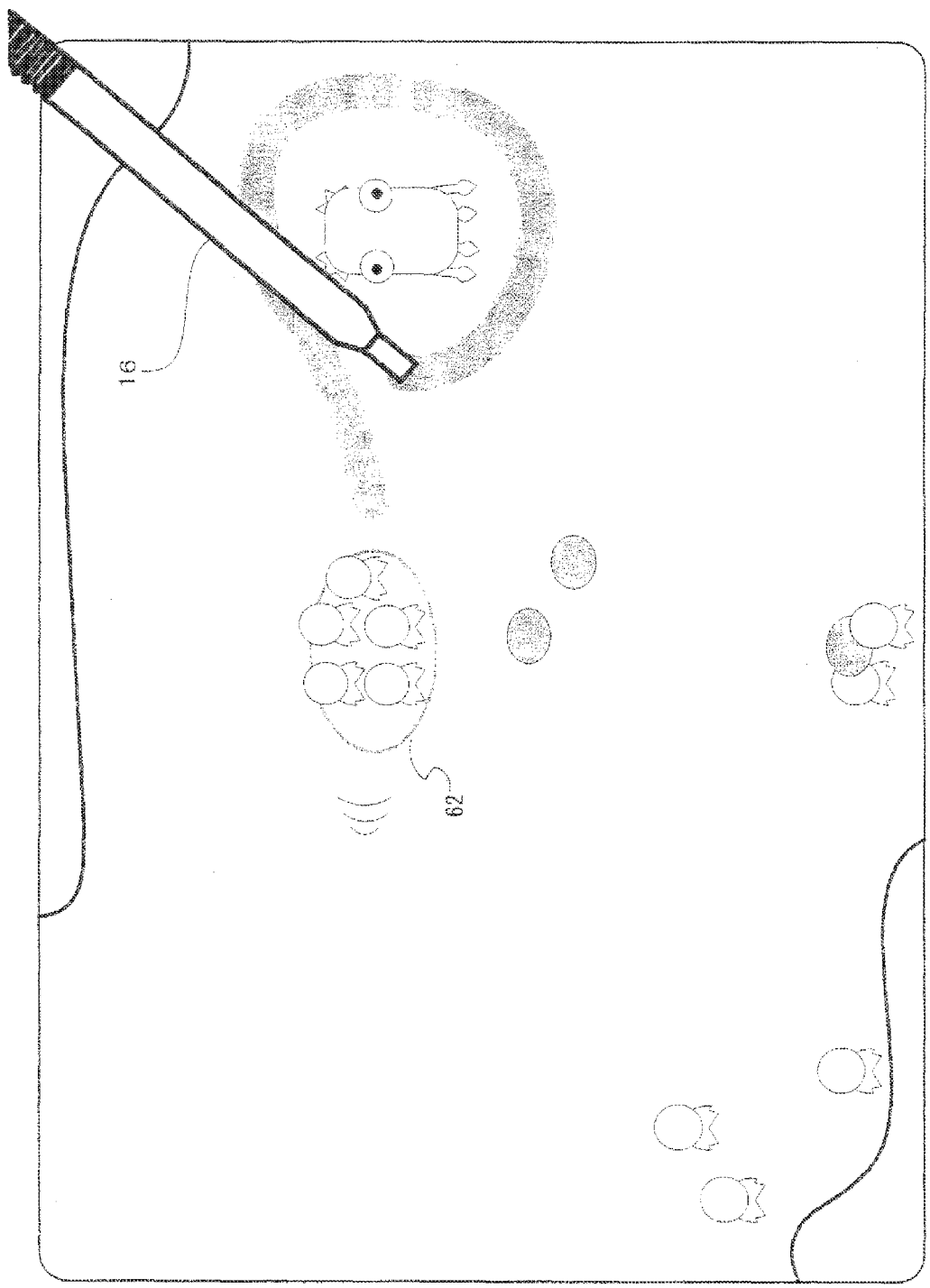
FIG. 24 is a diagram illustrating a state in which the opponent character is being enclosed.
Figure 25:
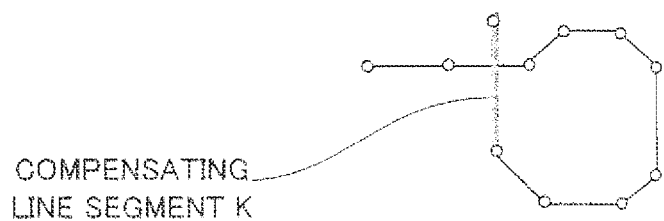
FIG. 25 is a diagram illustrating an example of a compensated input track.

Returning to FIG. 22, subsequent to the intersection determination process of step S46, it is determined in step S47 whether or not the intersection flag is set as ON. When it is determined that the intersection flag is set as ON (Yes in step S47), that is, it is determined that the input track forms an enclosed area, the process is advanced to step S51. On the other hand, when it is determined that the intersection flag is set as OFF (No in step S47), the compensating line segment K calculated in step S45 is set as the line segment W in step S48. Next, the aforementioned intersection determination process is performed in step S49. That is, it is determined whether or not the compensating line segment K intersects a line segment of the input track. This determination is performed, for example, for the following reason. Although a player thinks that the player has performed an operation for enclosing the opponent character 43, the enclosed area may not have been formed because the input track is slightly too short to completely form the enclosed area as shown in FIG. 24. Even in this case, that is, even in a case where the input track is slightly too short to completely form the enclosed area, a line segment having been finally obtained is extended, thereby determining that the enclosed area is written. When the input track is as shown in FIG. 24, a compensated input track as shown in FIG. 25 is recognized. As a result, the enclosed area is determined to be formed by the compensated input track. Thereby, unfavorable impression that controllability is not good will not be given to a player. The intersection determination process is the same as the process of step S46 described above, and a detailed description is not given here.

After the intersection determination process of step S49, it is determined in step S50 whether or not the intersection flag is set as ON. When it is determined that the intersection flag is set as OFF (No in step S50), that is, when it is determined that the enclosed area is not formed by the compensated input track, the in-operation process is ended. On the other hand, when it is determined that the intersection flag is set as ON (Yes in step S50), that is, when it is determined that the enclosed area is formed by the compensated input track, it is determined in step S51 whether or not one or more objects are in the enclosed area on the screen. For example, when it is determined that the intersection flag is set as ON, an intersection of the line segments W and L is set as both a starting point and an end point so as to calculate, as the enclosed area, a polygon indicated by a line connecting respective coordinate points (including coordinate points on the compensating line segment K in the case of the line segment L being determined to intersect the compensating line segment) in order of time according to the input coordinate list 252. A plurality of straight lines (sides) each passing through two adjacent points form the enclosed area (polygon), and the plurality of straight lines (sides) are used as a demarcation between the enclosed area and a non-enclosed area. At this time, when a line segment connecting a coordinate point of an object to the center point of the enclosed area does not intersect any one of the plurality of the straight lines (sides), the object is determined to be within the enclosed area. In this manner, it is determined whether or not all the objects on the screen are within the enclosed area. Alternatively, it is determined whether or not a coordinate value of each object is equal to each of coordinate values in the enclosed area (coordinate range), thereby determining whether or not the object is within the enclosed area. When no object is determined to be within the enclosed area (No in step S51), the in-operation process is ended.

On the other hand, when it is determined in step S51 that one or more objects are in the enclosed area (Yes in step S51), it is determined in step S52 whether or not the number of the objects in the enclosed area is at least two. When it is determined that the number of the objects in the enclosed area is less than two, that is, the number of objects in the enclosed area is one (No. in step S52), the task content determination table 253 is referred to, and a task process according to a type of the object is started in step S53. Here, the task process is a process of the object in the enclosed area (hereinafter, referred to as a target object) or a focus character exerting an effect on the other. In other words, the task process does not include a process in which no change occurs in the target object, such as a process of just orienting the focus character toward the target object. Specifically, the task process includes a process in which, when the target object is the opponent character 43 as shown in FIG. 11, the focus character attacks the opponent character 43 as shown in FIG. 12. That is, the focus character exerts such an effect as to reduce a parameter value of the opponent character 43, the parameter value representing a physical capacity or the like. Further, the task process includes a process of the opponent character 43 attacking the focus character. That is, the opponent character 43 exerts such an effect as to reduce a parameter value of the focus character. Further, for example, the task process includes a process in which, when the target object is the food 42, the focus character carries the food 42 to their base, that is, the focus character moves the food 42 (a coordinate value of the food 42 is changed). Further, the task process includes a process in which, when the target object is the player character 41 which is not designated as the focus character, the focus flag 256 of the player character is set as "ON" (which corresponds to change in parameter value) so as to add the player character to the array as shown in FIGS. 13 and 14.

On the other hand, when it is determined in step S52 that a plurality of objects are in the enclosed area (Yes in step S52), a priority value for each object based on a type of the object in the enclosed area is obtained referring to the task content determination table 253. An object of the type having the smallest priority value is set as the target object and the task process is started in step S53. For example, when both the opponent character and the player character are in the enclosed area, the focus character starts an attack on the opponent character 43 because the opponent character has a lower priority value than the player character as shown in FIG. 17. When a plurality of objects in the enclosed area have the same type and the type indicates the player character 41, the plurality of objects (that is, the player characters 41) in the enclosed area are all added to the array. When a plurality of objects in the enclosed area have the same type and the type indicates an object other than the player character 41, only an object closest to the focus character among the plurality of objects is set as the target object. Alternatively, when a plurality of objects in the enclosed area have the same type and the type indicates an object other than the player character 41, all the objects in the enclosed area can be sequentially designated as the target object in order of the priority value so as to perform the task process. This is the end of the in-operation process.

Returning to FIG. 19, next, a process performed when it is determined in step S9 that the in-operation flag 257 is set as OFF will be described. When it is determined in step S9 that the in-operation flag 257 is set as OFF, it indicates that a portion of the screen other than the array is being kept touched. In this case, a non-in-operation process described below will be performed in step S11.

Figure 26:
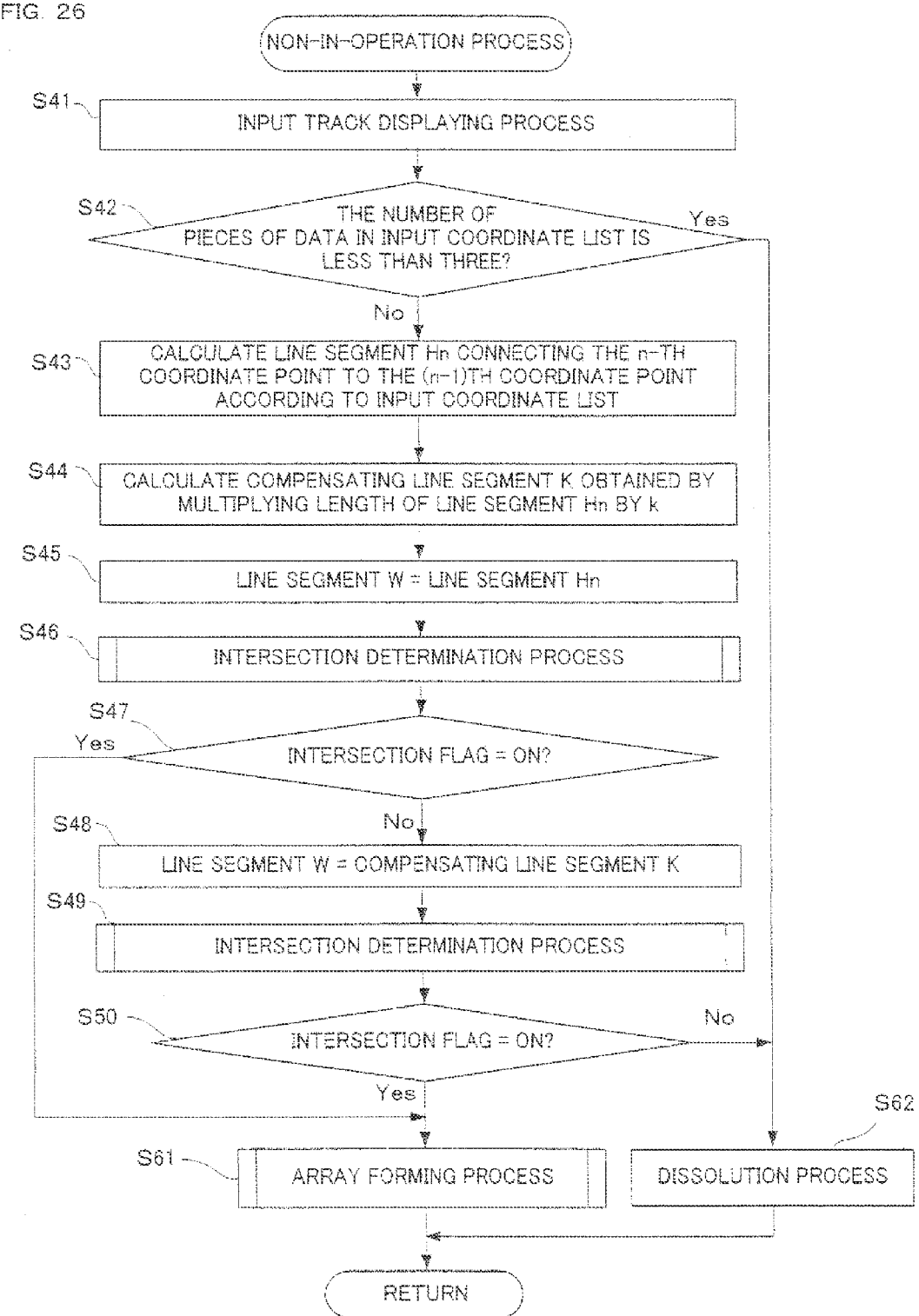
FIG. 26 is a flow chart illustrating in detail a non-in-operation process of step S11 shown in FIG. 19.

FIG. 26 is a flow chart illustrating in detail the non-in-operation process of step S11. In FIG. 26, initially, an input track indication process and a process of determining whether or not the input track made by a player forms the enclosed area are performed in steps S41 to S50. The processes of steps S41 to S50 are the same as the processes of steps S41 to S50 described above for the in-operation process and a detailed description is not given.

When it is determined in step S50 that the enclosed area is not formed, the process is advanced to a dissolution process of step S62. In the dissolution process, when an array is formed and a predetermined condition is satisfied, a process for dissolving the array is performed. The process of step S62 does not directly relate to the game program disclosed herein and the detailed description is not given.

Figure 27:
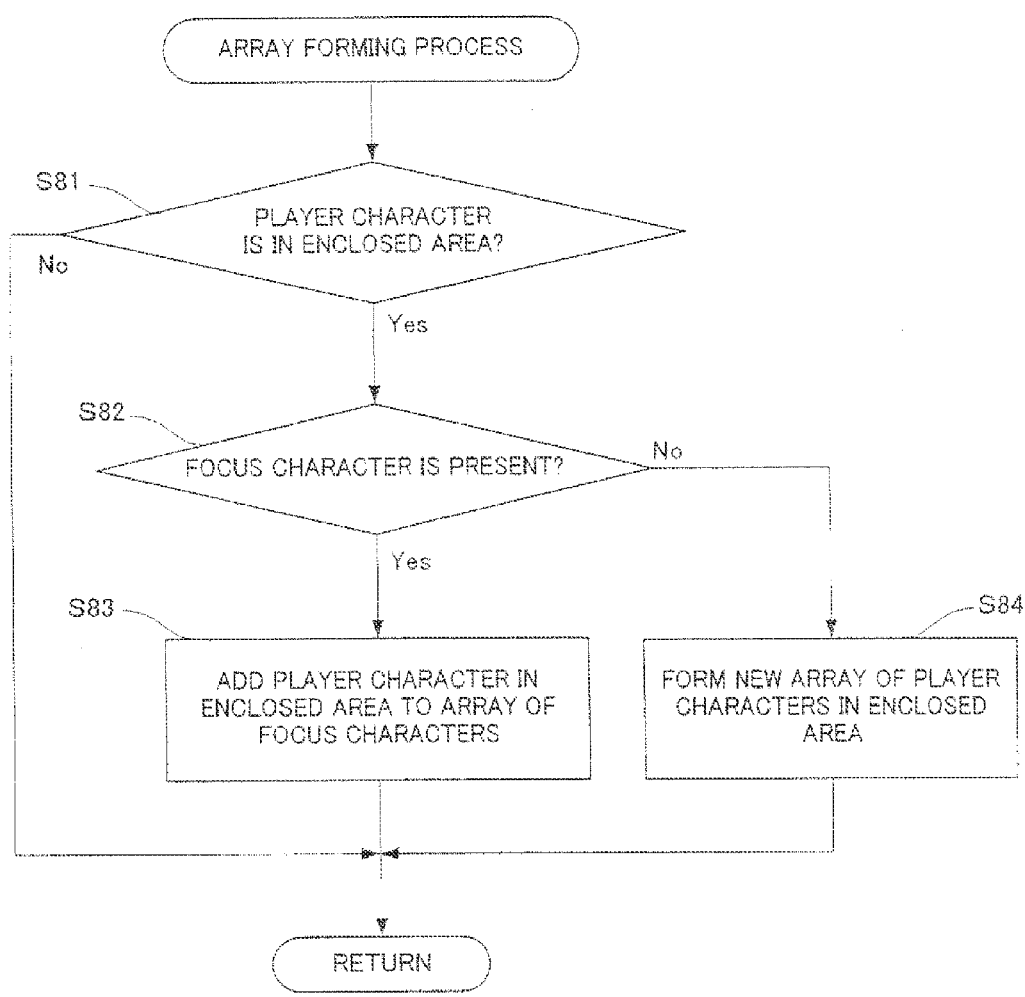
FIG. 27 is a flow chart illustrating in detail an array forming process of step S61 shown in FIG. 26.

On the other hand, when it is determined in step S47 or S50 that the enclosed area is formed (Yes in step S47 or S50), an array forming process is performed in step S61. FIG. 27 is a flow chart illustrating in detail the array forming process of step S61. In FIG. 27, initially, it is determined in step S81 whether or not one or more player characters which are not designated as the focus character are in the enclosed area. When it is determined that the player character 41 which is not designated as the focus character is not in the enclosed area (No in step S81), the array forming process is ended. On the other hand, when one or more player characters 41 which are not designated as the focus character are in the enclosed area (Yes in step S81), it is determined in step S82 whether or not one or more focus characters are present. When one or more focus characters are present (Yes in step S82), a process of adding, to the array, the player character 41 which is not designated as the focus character and is in the enclosed area is started in step S83. When no focus character is present (No in step S82), the player characters 41 which are not designated as the focus character and are in the enclosed area form an array in step S84. In step S84, the player characters 41 in the enclosed area have their focus flags set as ON so as to be gathered into one place and enclosed by the operation circle 62 for display. The process of step S84 does not directly relate to the game program disclosed herein, and the detailed description is not given. This is the end of the non-in-operation process.

Returning to FIG. 19, subsequent to the non-in-operation process of step S11, the screen writing process of step S7 described above is performed. Next, it is determined in step S8 whether or not a game end condition is satisfied. When it is determined that the game end condition is not satisfied (No in step S8), the process is returned to step S2 and the same process is repeated. On the other hand, when it is determined that the game end condition is satisfied (Yes in step S8), the game process is ended. This is the end of the game process according to the present embodiment.

Thus, according to the present embodiment, when a player character is being subjected to movement operation using the pointing device, a selection operation, which is incorporated into a process flow of the movement operation, can be performed. Therefore, an additional operation such as pressing a button for selection can be eliminated, thereby providing the player with a game having improved controllability.

In the present embodiment, an operation performed using the stick 16 (or a finger) is described as an example. The operation is not restricted thereto. For example, a mouse can be used as the pointing device. In this case, an operation of moving the mouse with a left button of the mouse being kept pressed corresponds to an operation of moving the stick 16 touching the touch panel 15 as described above. Further, an operation of removing a finger from the left button of the mouse corresponds to the touch-off operation.

Moreover, according to the present embodiment, in the array forming process (step S61) for the non-in-operation process, only the player character 41 is used as a target of the task process. However, an object other than the player character can be used as a target to be processed as in the in-operation process of step S10. That is, in step S81 shown in FIG. 27, it is determined whether or not one or more objects are in the enclosed area regardless of whether or not the objects are the player characters. When it is determined that one or more objects are in the enclosed area and the focus characters are present, the task process may be performed between the focus characters and the object in the enclosed area. On the other hand, when it is determined that one or more objects are in the enclosed area and no focus character is present, no process may be performed.

Furthermore, according to the present embodiment, the task process can be included in a process for enclosing an object during movement of the focus character. The object may not be selected by being enclosed. For example, when the input track passes through an object to be selected as a target of the task process, the task process may be started. In this case, it is determined whether or not the input track passes through the hit determination area of each object. When the input track passes through the hit determination area, the task process may be started.

While the present invention has been described in detail, the foregoing description is in all aspects illustrative and not restrictive. It is understood that numerous other modifications and variations can be devised without departing form the scope of the invention.

What is claimed is:

1. A non-transitory storage medium having stored thereon a game program which causes a computer, in a game apparatus comprising a pointing device for indicating a position on a display screen on which a game image is displayed, to execute:
    a coordinate detection step which detects, at regular time intervals and based on output signals from the pointing device, a series of coordinate values each of which values is inputted through the pointing device and indicates a position on the display screen;
    a first control step which controls a first object displayed on the display screen based on the output signals from the pointing device;
    a selection determination step which determines, based on the series of coordinate values detected at the coordinate detection step and while the first object is being controlled at the first control step, whether or not a second object displayed on the display screen has been selected; and
    an action control step which controls the second object to move toward a position of the first object, when the selection determination step determines that the second object has been selected.

2. The non-transitory storage medium having stored thereon the game program, according to claim 1, wherein the game program further causes the computer to execute a movement control step which controls, based on the series of coordinate values detected at the coordinate detection step, the first object and the second object having moved at the action control step to collectively move in a unified manner.

3. The non-transitory storage medium having stored thereon the game program, according to claim 1, wherein the game program further causes the computer to execute:
    a second control step which controls, based on the output signals from the pointing device, the first object and the second object;
    the selection determination step which determines, based on the series of coordinate values detected at the coordinate detection step and when the first object and the second object are being controlled at the second control step, whether or not a third object displayed on the display screen has been selected, and
    the action control step further controls, when the selection determination step determines that the third object has been selected, one of the third object, or the first and second objects, to perform a predetermined action on the other of the third object, and the first or second objects.

4. The non-transitory storage medium having stored thereon the game program, according to claim 1, wherein when the selection determination step determines that the second object has been selected, the action control step adds the second object to an array that includes the first object.

5. A game apparatus including a display screen, a pointing device controlled by a player to indicate positions on the display screen and a computer which executes a game program stored to be accessible by the game apparatus to cause the computer to generate virtual objects to be displayed on the display screen, wherein execution of the game program causes the game apparatus to:
    detect a series of coordinate values inputted to the game apparatus by the pointing device, wherein each coordinate value indicates a position on the display screen;
    control a first object displayed on the display screen based on the series of coordinate values;
    determine whether a second object displayed on the display screen is selected based on the series of coordinate values, wherein the determination of the selection of the second object is made while the first object is being controlled, and
    moving the second object towards the first object in response to the determination that the second object has been selected.

6. The game apparatus of claim 5 wherein the game program, when executed by the computer, further causes the game apparatus to move the first object and the second object in unison and based on the series of coordinate values.

7. The game apparatus of claim 5 wherein the game program, when executed by the computer, further causes the game apparatus to:
  determine whether a third object displayed on the display screen is selected based on an additional series of coordinate values detected based on inputs by the pointing device and while the first object and the second object are being controlled by the pointing device, and
  perform a predetermined action on at least one of the third object, the first object and the second object in response to the determination that the third object is selected.

8. The game apparatus as in claim 5 wherein the game program, when executed by the computer, further causes the game apparatus to add the second object to an array including the first object in response to the determination that the second object has been selected.

9. A game system including a display screen, a pointing device controlled by a player to indicate positions on the display screen, a non-transitory storage medium and a computer executing a game program stored on the non-transitory storage medium, wherein execution of the game program causes the game system to:
  detect a series of coordinate values corresponding to positions on the display screen indicated by the pointing device;
  controlling a first object displayed on the display screen using the pointing device;
  selecting a second object displayed on the display screen based on the series of coordinate values and while the first object is being controlled, and
  moving the second object towards the first object in response to the selection of the second object.

10. The game system of claim 9 wherein the game program, when executed by the computer, further causes the game system to move the first object and the second object in unison and based on additional coordinate values indicated by the pointing device pointing to the display screen.

11. The game system of claim 9 wherein the game program, when executed by the computer, further causes the game apparatus to:
  determine whether a third object displayed on the display screen is selected based on an additional series of coordinate values detected based on inputs by the pointing device and while the first object and the second object are controlled by the pointing device, and
  perform a predetermined action on at least one of the third object, the first object and the second object in response to the determination that the third object is selected.

12. The game system of claim 9 wherein the game program, when executed by the computer, further causes the game apparatus to add the second object to an array including the first object.

13. A method for controlling objects of a game shown on a display screen using a pointing device controlled by a player, the method comprises:
  controlling a first object displayed on the display screen using the pointing device;
  detecting a series of coordinate values corresponding to positions on the display screen indicated by the pointing device;
  selecting a second object displayed on the display screen based on the series of coordinate values and while the first object is being controlled, and
  moving the second object towards the first object in response to the determination that the second object has been selected.

14. The method of claim 13 further comprising moving the first object with the second object based on additional coordinate values indicated by the pointing device while pointing to the display screen.

15. The method of claim 13 further comprising:
  determining whether a third object displayed on the display screen is selected based on an additional series of coordinate values detected based on inputs by the pointing device and while the first object and the second object are both controlled by the pointing device, and
  performing a predetermined action on at least one of the third object, the first object and the second object in response to the determination that the third object is selected.

16. The method of claim 13 further comprising including the second object in an array having the first object.

* * * * *